United States Patent [19]

Curley et al.

[11] 3,821,709

[45] June 28, 1974

[54] MEMORY STORAGE SEQUENCER

[75] Inventors: John L. Curley, Sudbury; Thomas J. Donahue, Hudson; Benjamin S. Franklin, Boston, all of Mass.; Wallace A. Martland, Nashua, N.H.; Louis V. Cornaro, Billerica, Mass.

[73] Assignee: Honeywell Information Systems Inc., Waltham, Mass.

[22] Filed: Oct. 5, 1972

[21] Appl. No.: 295,331

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,534,339 | 10/1970 | Rosenblatt | 340/172.5 |
| 3,543,246 | 11/1970 | Adams | 340/172.5 |
| 3,560,935 | 2/1971 | Beers | 340/172.5 |
| 3,576,542 | 4/1971 | Floyd | 340/172.5 |
| 3,638,198 | 1/1972 | Balogh | 340/172.5 |
| 3,665,406 | 5/1972 | Gallagher et al. | 340/172.5 |
| 3,678,463 | 7/1972 | Peters | 340/172.5 |
| 3,701,109 | 10/1972 | Peters | 340/172.5 |
| 3,703,707 | 11/1972 | Bovett | 340/172.5 |
| 3,706,974 | 12/1972 | Patrick et al. | 340/172.5 |

*Primary Examiner*—Paul J. Henon
*Assistant Examiner*—Mark Edward Nusbaum
*Attorney, Agent, or Firm*—Nicholas Prasinos; Ronald T. Reiling

[57] ABSTRACT

An asynchronous Memory Store Sequencer (MSS) for processing information between Main Memory Store (MMS) and a Central Processing Unit (CPU) or Input Output Control unit (IOC), and for resolving conflicts for memory access between the CPU and the IOC. The MSS interfaces with four Main Memory Modules which may be two-way or four-way interleaved. Information is generally processed from or to the CP via a high-speed low-capacity Buffer Store, whereas information from or to the IOC is processed direct to Main Memory under control of the MSS. Simultaneous requests for access into or out of Main Memory Store (MMS) by the CP or IOC are resolved by priority resolving means in the MSS in favor of the IOC; moreover the MSS can reserve the MMS for the IOC even though the IOC is not currently requesting use of MMS. Priority is resolved by delaying a request for main memory by the CP for a time sufficient to insure that the IOC gains control of the MSS.

16 Claims, 15 Drawing Figures

MEMORY STORAGE SEQUENCER

RELATED APPLICATIONS

1. "Buffer Store" invented by J. L. Curley, T. J. Donahue, W. A. Martland, and B. S. Franklin, filed on same date as the instant application, having Ser. No. 295,301 and assigned to the same assignee named herein.

2. "Variable Masking for Segmented Memory" invented by Wallace A. Martland and John L. Curley, filed on same date as the instant application, having Ser. No. 295,303 and assigned to the same assignee named herein.

3. "Main Memory Reconfiguration" invented by T. J. Donahue, John L. Curley, Benjamin S. Franklin, W. A. Martland, and L. V. Cornaro, filed on same date as the instant invention, having Ser. No. 295,417 and assigned to the same assignee named herein.

4. "Override Hardware for Main Store Sequencer" invented by Thomas J. Donahue, filed on same date as the instant application, having Ser. No. 295,418 and assigned to the same assignee named herein.

BACKGROUND OF THE INVENTION

1. Field of the Invention

This invention relates generally to computer interface systems between a Central Processing Unit (CP) or an Input/Output Unit (I/O) and Main Memory and/or Buffer Store, and more particularly to a Main Store Sequencer (MSS) for resolving main memory conflicts between the CPU and IOC.

2. Description of the Prior Art

In most computer systems generally, and in multiprocessor systems in particular, processors must compete with each other or with input/output devices for access to main memory or buffer store (if any), because a memory can generally service only one processor device at a given time. To resolve priority, several prior art schemes have been utilized. One technique tries to minimize simultaneous access to main memory by decreasing the probability of simultaneous access requirements. The memory is physically constructed in a number of separate, independent, relatively small modules of memory, and is provided with a centralized switch that can connect any memory module to any processor in accordance with the memory access needs of the processor. It can readily be seen that the more modules there are, the greater is the probability of a processor obtaining unimpeded access to a particular module it desires; thus a given processor's performance is not degraded by interference from other processors. This scheme is utilized in part in the instant invention, but there are serious drawbacks to its use exclusively. For example, for a given total size of memory, if the memory modules are doubled, the physical hardware in the memory system practically doubles, even though the number of memory storage units (i.e. cores, flip-flops) has not changed.

In order to utilize the benefits of the above system and minimize its disadvantages one prior art system utilizes a Memory Bus Controller (MBC) which acts as an arbitrator to resolve conflicts where more than one processor needs access to a particular memory module. The MBC contains four link flops for each memory module coupled to the MBC with priority logic associated with each set of each link flops. The function of the link flops is to indicate whether a particular module is busy or available. If the module is available, the priority logic associated with the link flops of that module, evaluates at each clock interval any processor requests for the module, and issues an acknowledgement to a selected processor and a start common to the memory module, thus connecting the two together for one memory accessing cycle. If two or more processors simultaneously request a given memory module, then the MBC resolves the conflict on a predetermined priority basis (i.e. an IOC unit has priority over a CP unit) and one unit is selected to access the memory module whereas the other unit stalls or is placed in a "wait" condition for one full clock cycle. In this prior art scheme priority is settled during one clock cycle. Once priority is settled another clock cycle is required for the "winner" to issue its Go signal. It is readily seen that a delay of at least one additional clock cycle is required to direct main memory that information is available and ready for its use. Moreover the hardware for this system is quite complex requiring a central timing clock, relatively complex priority logic, temporary memory flops to store request and acknowledge signals, and a relatively complex system (i.e. memory bus controller.)

Another more recent device is described in a U.S. Pat. No. 3,676,860 issued to W. W. Collier et al., entitled Interactive Tie-Breaking System. It is a "multiple processor tie-breaking method separately and asynchronously used by each of any number of plural processors contending for a serially reusable resource (SRR). The contending processors independently and asynchronously interact in their use of the tie-breaking method to choose among themselves which processor will get the SRR.

"The method uses a common group of registers (or fields) accessible to all contending processors. The method permits uncoordinated fetching and storing of bits in those registers. Only one bit at a time need be fetched or changed by any processor. In fact, the plural independent processors can concurrently fetch or store the same bit in the common group of registers without affecting the reliability of the method.

"The priorities among processors dynamically change with every contention in a manner which gives each processor an equitable and equal chance of getting the SRR." (Patent Office, Official Gazette, July 11, 1972; p. 789.) Once again, it appears obvious that relatively complex and highly sophisticated circuitry is required.

Still another prior art device for determining priority is described in U.S. Pat. No. 3,473,155 and issued to J. F. Coulleir et al., on Oct. 14, 1969 entitled Apparatus Providing Access to Store Device on Priority. In that device identification of the highest priority channel currently requiring access to a communication link is made, whereby access to a communication link is provided for one link-cycle to the highest priority channel then in competition with other lower priority channels for access to the same communication link. (See also U.S. Pat. Nos. 3,490,003; 3,440,616).

The majority of these devices have either one or all of the following disadvantages: complex and highly sophisticated circuitry, use of an additional central clock cycle, require temporary signal storage devices and also require a central clock.

The use of an asynchronous device for determining priority in accessing memory eliminates the need of a central timing means, but introduce signal race problems. For example, a signal such as a request for memory signal issued by an IOC may reach its destination at a later time than a request signal issued by the CP, even though both signals were issued simultaneously. This phenomenon is due to various minimum or maximum time delays that are encountered by a given signal in its path. This creates an uncertainty time region (i.e. circuit time skew) bounded by the total of minimum and maximum time delays that a signal encounters. This circuit time skew can have a range of 3–100 nanoseconds, and creates an asynchronous network with this built in skew for such transmit/receive signals as request and acknowledge signals. Hence in an asynchronous priority resolving scheme the circuit time skew must be neutralized so that access to memory is given to the device having the higher priority over a competing lower priority unit i.e. the higher priority device must always win the race as between two substantially simultaneously issued requests from two separate units for access to main memory. Moreover this should be accomplished utilizing a minimum of temporary signal storage devices, relatively simple circuitry, and a minimum of central clock timing cycles.

OBJECTS

It is an object, therefore, of the invention to provide an improved memory sequencer.

It is another object of the invention to provide a memory sequencer for processing information between main memory store (MMS) and a central processing unit (CPU) or input output control unit (IOC).

It is still another object of the invention to provide a memory sequencer that resolves conflicts for memory access between competing units.

It is still a further object of the invention to provide a memory sequencer that neutralizes the effects of circuit time skew and assures that the highest priority unit will gain first access to main memory when simultaneous requests to access memory is made by competing units.

Yet another object of the invention is to provide a memory sequencer that is reliable in operation and is relatively simple to manufacture and operate.

Other objects of the invention will become apparent from the following description of the preferred embodiment of the invention when read in conjunction with the drawings contained herewith.

SUMMARY OF THE INVENTION

The foregoing objects are achieved, according to the instant invention by an asynchronous Main Store Sequencer (MSS) for processing information between Main Memory Store (MMS) and a Central Processing Unit (CPU) or between MMS and an Input Output Control Unit (IOC).

The MSS interfaces with four Main Memory Modules which may typically be two-way or four-way interleaved. Information is processed typically from or to the CP via a high-speed low-capacity Buffer Store, whereas information from or to the IOC is processed, typically, direct to main memory under control of the MSS.

A main feature of the invention is the resolution of conflicts for access to main memory by conflicting units, by delaying a request for memory by the lower priority unit for a length of time sufficient to insure that the higher priority unit gains control of the MSS. Variable delay line means in the MSS provide relatively simple hardware requiring a minimum of temporary signal storage means a minimum of request and acknowledge lines and no central clock.

Another feature of the invention is the inclusion of means that neutralizes the effects of circuit time skew and assures that the highest priority unit will gain access to main memory when simultaneous requests to access memory is made by competing units.

DESCRIPTION OF A PREFERRED EMBODIMENT

GENERAL

Figure 1:
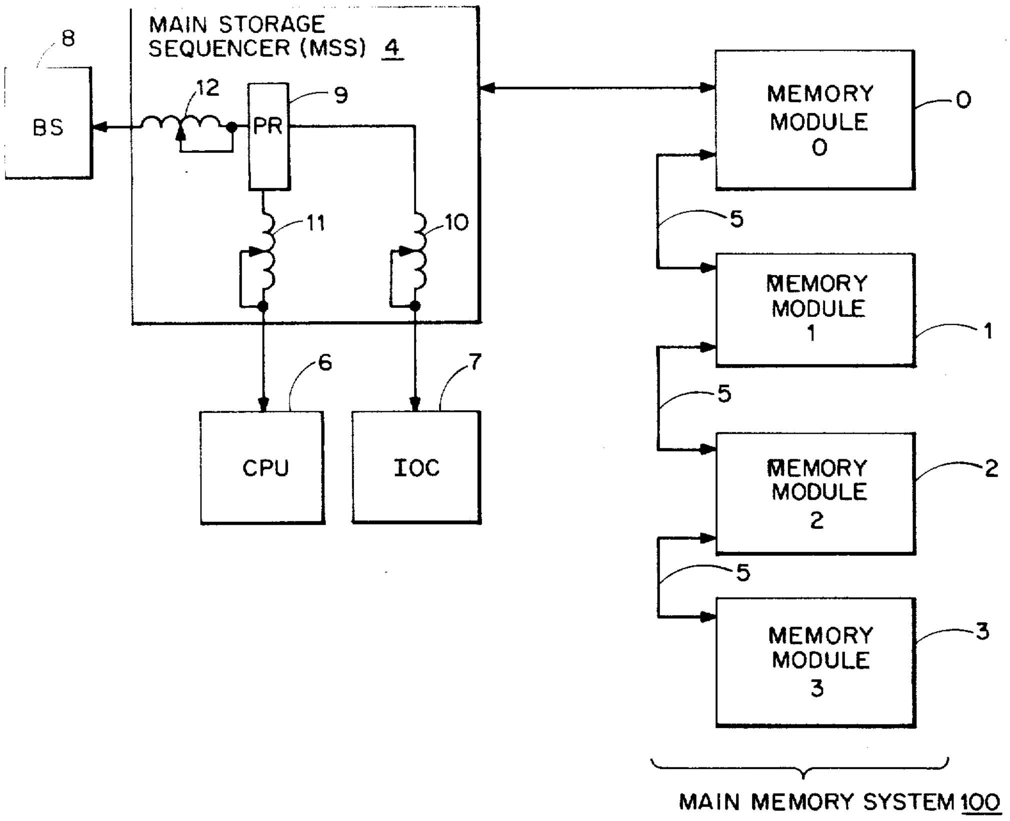
FIG. 1 is an overall block diagram showing the invention architecture.
Figure 12:
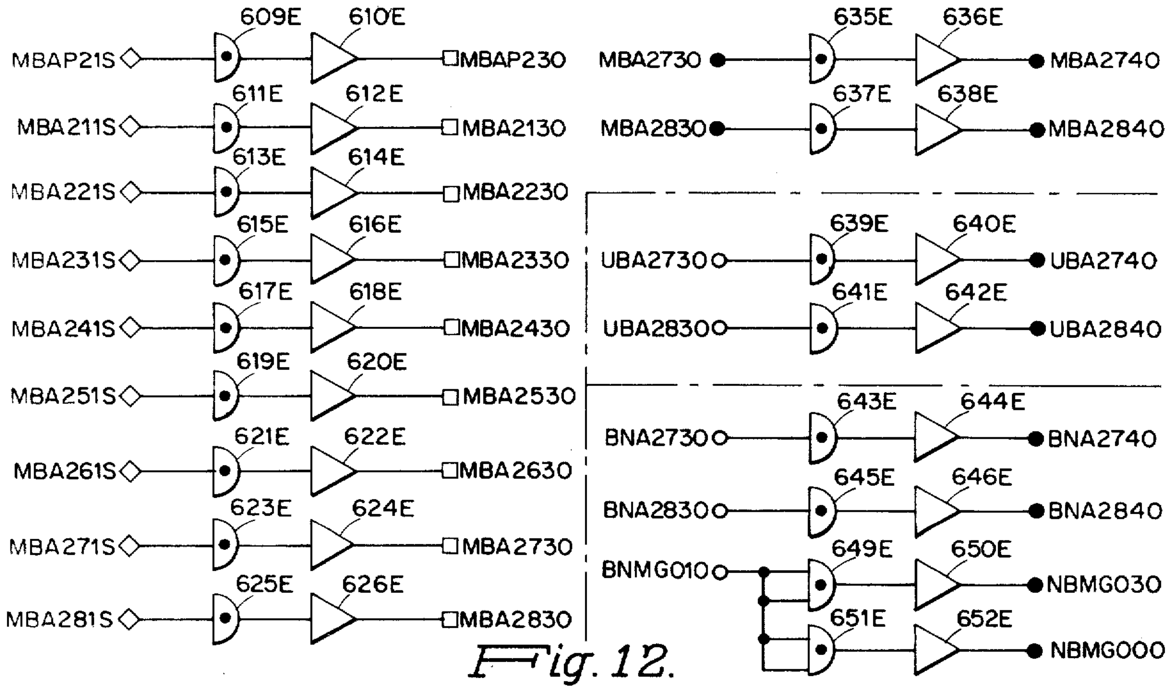
FIG. 12 is a logic block diagram of IOC address amplifiers.

Referring to FIG. 1 there is shown a block diagram of the architecture of the invention. In general a Main Store Sequencer 4 has a Priority Resolver 9 for resolving conflicts between the Central Processing Unit 6, the Input Output Controller 7, and the Buffer Store 8, when these units simultaneously request access to main memory 100. The request for memory is under the control of a central clock (not shown) of the CPU 6. The requests from multiple units may be similar to the interrupt operations described in columns 231–251 of U.S. Pat. No. 3,077,984, issued Feb. 19, 1973, and shown in FIG. 198 a of that patent. The requests termed interrupts in that patent are stored in demand flip-flops such as $L_w$ or $U_r$ of that patent. Upon the issuance of a timing or strobe signal $T_i$ an instruction interrupt operation is excuted. Hence, all issuances of interrupts or requests have a common base point. Similarly, in this invention, a common base point for issuing requests may be utilized using the PDA clock on FIG. 3 as a strobe unit. The actual resolution of priority is under the asynchronous control of the Main Store Sequencer 4. Since a synchronous device (the DDA clock) is utilized to start a main memory request from any of the competing devices, a common base point is provided for measuring time thereafter. Hence, since it is desirable to provide memory access to the IOC which sometimes may be under conditions of simultaneous requests for main memory by the CPU and BS, and because the CPU and BS are physically closer to the main memory store, there is a greater distance for the request signal from the IOC 7 to travel and therefore the IOC request signal could reach its destination at a later time than the CPU request signal. To assure that this does not happen, variable delay lines 10, 11 and 12 are provided in the main store sequencer 4, and are interposed between the IOC, CPU and BS and the Main Memory Store respectively. The Main Memory Store 100 is typically an MOS or core memory comprising typically 4 memory modules 0–3, daisy chained to each other by a memory bus 5.

Figure 2:
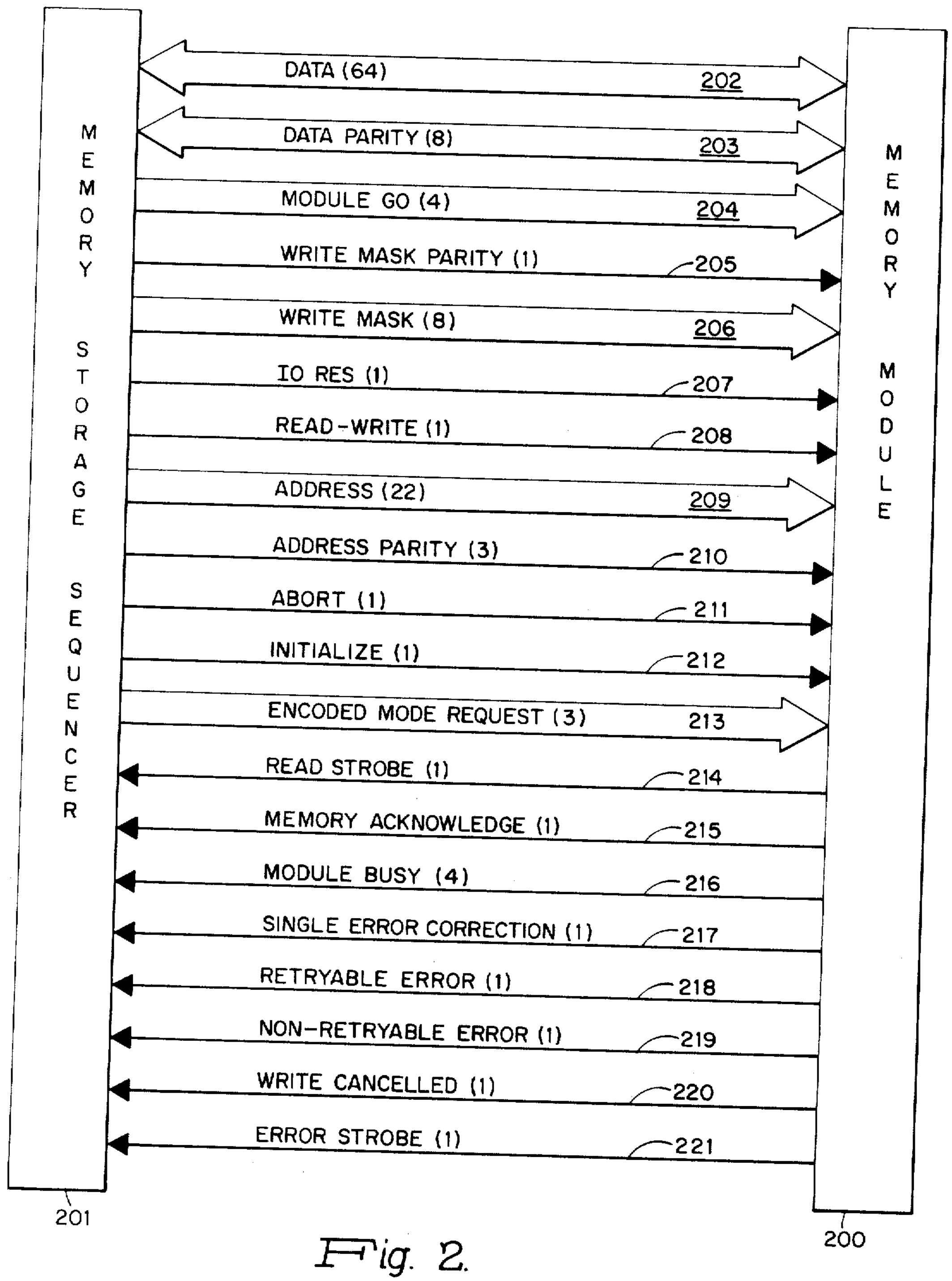
FIG. 2 is a block diagram showing interface lines between the invention and a typical memory module.

Referring to FIG. 2 there is shown the interface lines between a typical Memory Module 200 and the Main Store Sequencer 201. In FIG. 2 the number in parenthesis refers to the number of physical lines, in this embodiment, provided for carrying a signal/or signals for indicating a particular function or functions. It is to be understood that other total numbers of lines may be used to practice this invention.

There are typically 64 parallel bidirectional Data lines 202 which may carry positive pulses to be stored and/or utilized by the processing unit as a result of a read request. These Data lines also may carry voltage levels to be stored in an addressed memory module 200 as a result of a write request. Transfers of signals on these lines for a double-word (A byte is 8 bits. A write to MMS may be 0 to 8 bytes) is in parallel rather than serial or sequential mode. Associated with these data lines there are 8 parallel bidirectional Data Parity lines 203 for carrying signals for determining the parity of the data transmission. Odd parity is utilized.

There are 4 module strobe lines herein termed Go lines 204 which may carry Go signal levels which along with other signals indicate which memory module is to be accessed. In general the Go signal is utilized to indicate that all information needed by the MMS has been placed on the interface for the disposal of the MMS.

There are typically 8 Write Mask lines 206 which may carry signals to specify which byte or bytes (if any) within an eight byte double-word is/are to be written into main memory. Associated with the Write Mask lines there is also 1 Write Mask Parity line 205 utilized to carry a signal for checking the parity on the 8 Write Mask lines.

One IO reservation line 207 may carry an I/O cycle reservation signal for use in blocking a refresh cycle in the MOS memory refresh logic. (See Application Ser. No. 215,736, filed 12/27/71 on Technique for Refreshing MOS Memory and assigned to the same assignee as the instant invention for typical MOS memory refresh logic.)

There are 22 Address Lines 209 for addressing any double-word location within a given memory module. Associated with these address lines there is a read/write line 208 for carrying signals indicating to the memory module the type of operation it is to perform i.e. read or write. Also associated with the Address lines there are three Address Parity lines 210 for carrying the signals utilized in checking parity of a given address in a main memory module.

One Abort line 211 carries a signal indicating that the processor wishes to change its memory write request to a memory read operation. There is also one Initialize line 22 that carries a signal which forces all memory modules to reset all their error indicators, counters, and controls.

Three other lines, the Encoded Mode Request line 213 carry encoded signals requesting memory module operation in a special mode e.g. diagnostic mode. One Read strobe line signifies that read data on the data lines 202 is valid when a parity signal is carried thereon. A memory acknowledge line 215 is provided for signaling to the memory interface unit (MIU) to indicate that the selected memory module has received the request sent and is accepting it and therefore the MIU can release its Go, Address, Masks, and/or Read/Write lines that it may be holding.

Four Module Busy lines 216 are also provided, one for each memory module for carrying signals that indicate to the main store sequencer that the memory addressed is busy (i.e. in the middle of a cycle) when a negative signal is carried by a module busy line associated with the memory module addressed.

One Single Error Correction line 217 may carry positive pulses that indicate that a single bit data error has been corrected in a memory module. Another line, the Retryable Error line 218, indicates a memory error which is retryable by the CP or IOC has occurred e.g. error in any parameter except MMS clock whereas still another line, the Non-Retryable Error line 218 indicates that a memory error which is not retryable by the CP or IOC has occurred e.g. MMS clock. A Write Cancelled line 220 indicates that the memory module addressed changed a write request to a read operation when a positive pulse appeared on the Write Cancelled line 220. Finally the last line on FIG. 2 is an Error Strobe line 221 which is utilized when a positive pulse is thereon to latch error signals in the CP, IOC, or BS.

Figure 3:
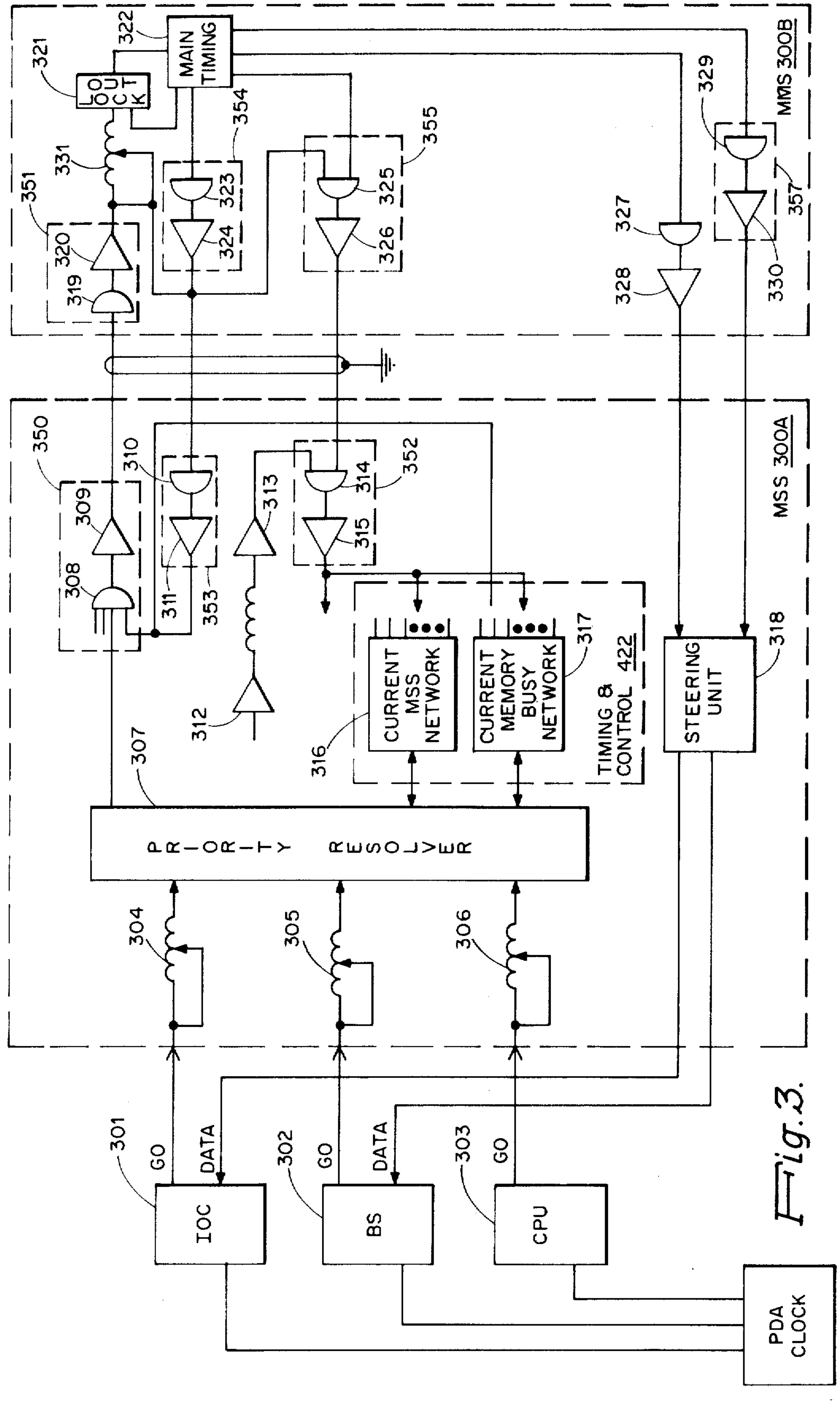
FIG. 3 is a high level logic block schematic diagram of the invention.

Referring to FIG. 3 there is shown a high level logic block diagram of the invention. The MSS 300–A is part of the Memory Interface Unit MIU shown on FIG. 3 of the above referenced related U.S. Pat. Application Ser. No. 295,301. The Main Store Sequencer (MSS) 300–A is coupled to and communicates to Main Memory Store (MMS) 300–B via the lines discussed supra in relation to FIG. 2. For the purpose of simplifying the explanation of the structure and operation of the invention FIG. 3 has been stripped of details that are to be shown, and described later in conjunction with other Figures below. The MSS 300–A comprises basically a Priority Resolver 307 which is coupled to Input/Output Control unit (IOC) 301, Buffer Store (BS) 302, and Central Processor Unit (CPU) 303 via Go lines and variable delay lines 304, 305 and 306 respectively. The Priority Resolver 307 basically senses the Go signal, sent by the IOC, BS, or CPU, which arrives first and assigns the MSS on that basis. In the situation where there is a simultaneous request from the IOC, BS and CPU as determined by the central clock (not shown) in the CPU, the variable delay lines 304, 305 and 306 provide an appropriate delay to ascertain that the request from the IOC 301 reaches the Priority Resolver 307 before the request of the BS 302 or the CPU 303. Once the request for a given memory module from a particular unit reaches the Priority Resolver, the MSS 300–A is given to that particular unit, and the competing units are locked out. Once a particular requesting unit (e.g. the IOC) has gained control of the MSS the Go signal is forwarded to an appropriate Memory Module Select Device 350 typified here by AND gate 308, and amplifier 309. The memory module select device only one of which is shown on FIG. 3 will be enabled when the appropriate signals are applied to the input of AND gate 308. Some typical signals that must be high for enabling AND gate 308 are as follows: (1) a signal indicating the memory module that is desired, (i.e. module address) (2) a signal indicating that the memory module desired is not busy, (3) a signal indicating which unit has been assigned control of the MSS, (4) and of course the Go signal. When the memory module select device 350, typified by AND gate 308 and amplifier 309, is enabled; the Go signal is then forwarded to the selected memory module to be received by a first Receiver Unit 351 typified by AND gate 319 and amplifier 320. When the first Receiver Unit 351 is enabled, the signal from it is applied to one input terminal of an Acknowledge Unit 355 typified by AND gate 325 and fast line driver 326. The other input signal to the Acknowledge Unit 355 issues from Memory Timing Unit 322, which provides an enabling signal to Acknowledge Unit 355 when the MMS 300–B is not in the process of refreshing itself. (See previously referenced application Ser. No. 215,736 for memory refresh apparatus and logic.) When both input signals to AND gate 325 of Acknowledge Unit 355 are high, the Acknowledge Unit is enabled and issues an acknowledge signal to the MSS 300–A indicating that it has received its appropriate Go signal and is working on its request associated with that Go signal. The acknowledge signal is received by a second Receiver Unit 352 which amplifies it and distributes it to a current MSS Busy Network 316, and a Current Memory Bush Network 317. Networks 316 and 317 are further coupled to Priority Resolver 307 for transmitting information thereto pertinent to the current state of memory future-use by the priority resolver in resolving conflicts and priorities. The acknowledge signal is also distributed back to the user i.e. IOC, BS, or CPU to indicate to the user that its request and all information associated therewith has been accepted and therefore the user may change requests and associated information.

The receipt of the acknowledge signal by the second Receiver Unit 352 is followed by a signal on Memory Busy Unit 353 typified by AND gate 310 and amplifier 311. The memory busy signal is generated by Memory Bush Generator 354 which receives its input information from Memory Timing Unit 322. The Memory Timing Unit, on the other hand, receives the Go signal issued by the user via delay line 331 and Lockout unit 321. The purpose of the Lockout unit is to prevent acceptance of another Go signal and to Lock-out another user from that particular memory module selected, while the first user is utilizing it. Once the Lockout Unit 321 is enabled, and the Go signal is received by Acknowledge Unit 355 as one input terminal of AND gate 325, the acknowledge signal can be issued when the other input terminal of AND gate 325 is driven high by a signal issued by Memory Timing Unit 322.

Data lines etc. (shown on FIG. 2) couple the IOC, BS, and CPU to the MMS 300–B via the MSS 300–A. Two such lines are shown for each unit on FIG. 3 although it is understood that they encompass all the lines of FIG. 2. Assuming that the IOC desires to perform a write cycle into an addressed location of a particular memory module; then the data is applied to the appropriate Data lines, moreover the write flag signal is applied to the Read/Write lines, the appropriate address signals where data is to be stored is applied to the Address lines; and the appropriate portions (i.e. bytes) of data to be written into the selected address is selected by applying the appropriate signals to the Write Mask lines, 206 and finally if more than one cycle is desired by the IOC a signal is applied to the IO Reservation line 207. When all these signals have been applied and have been checked for validity and the selected MMS module is not busy, then the Go signal of the IOC is allowed to be sent to the MMS indicating that all information is on the lines.

On a read cycle, similar lines are utilized; however a Strobe Unit 357 is located in MMS 300–B is enabled to indicate the information is available from the MMS. When AND gate 329 and amplifier 330 of Strobe Unit 357 is enabled the information on the group of Data lines, etc. is routed to Steering Unit 318 which directs the information to the appropriate requesting unit (the IOC In this case).

Figure 4A:
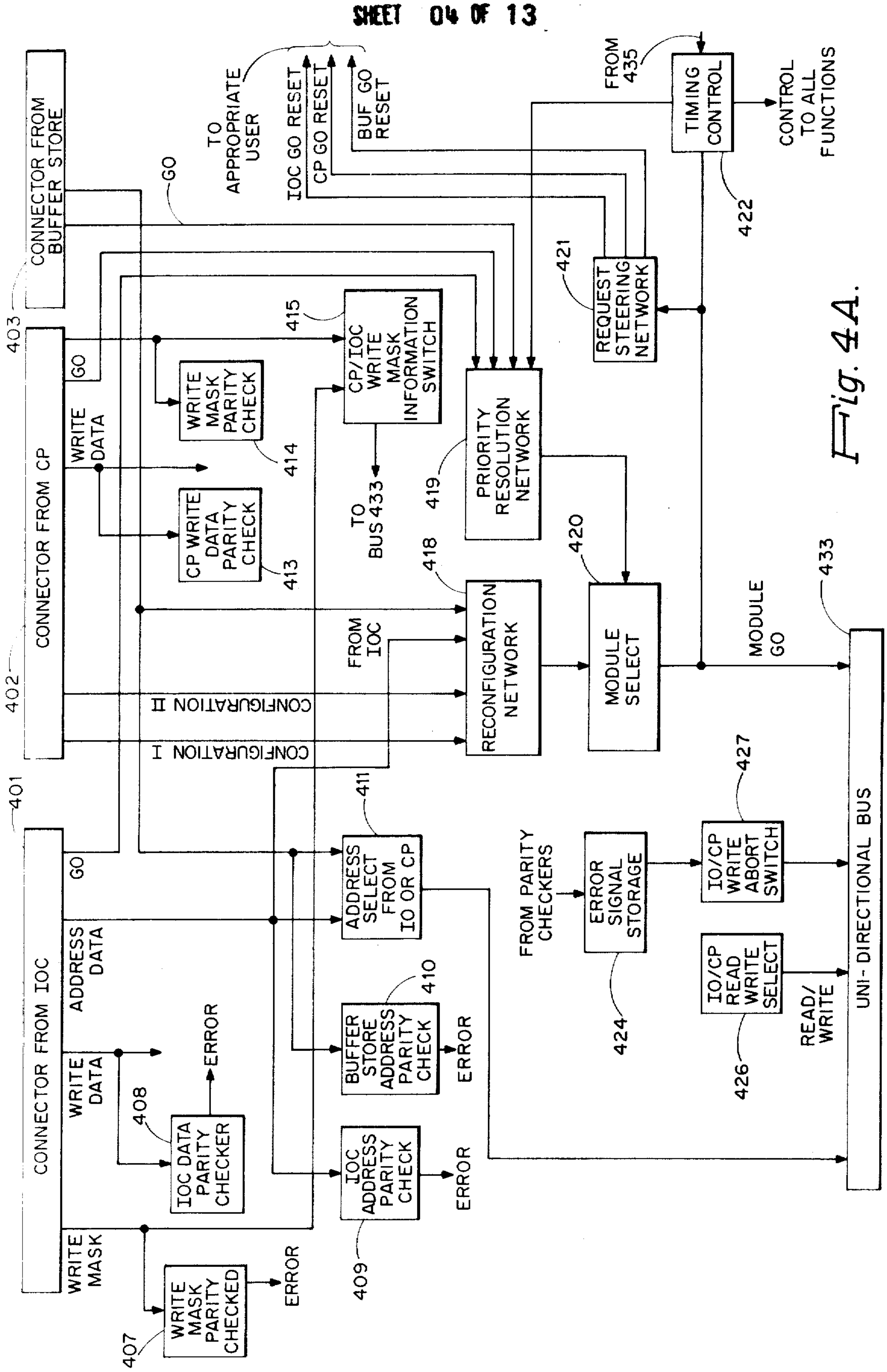
FIGS. 4A + 4B are high level block diagrams of the Main Store Sequencer.
Figure 4B:
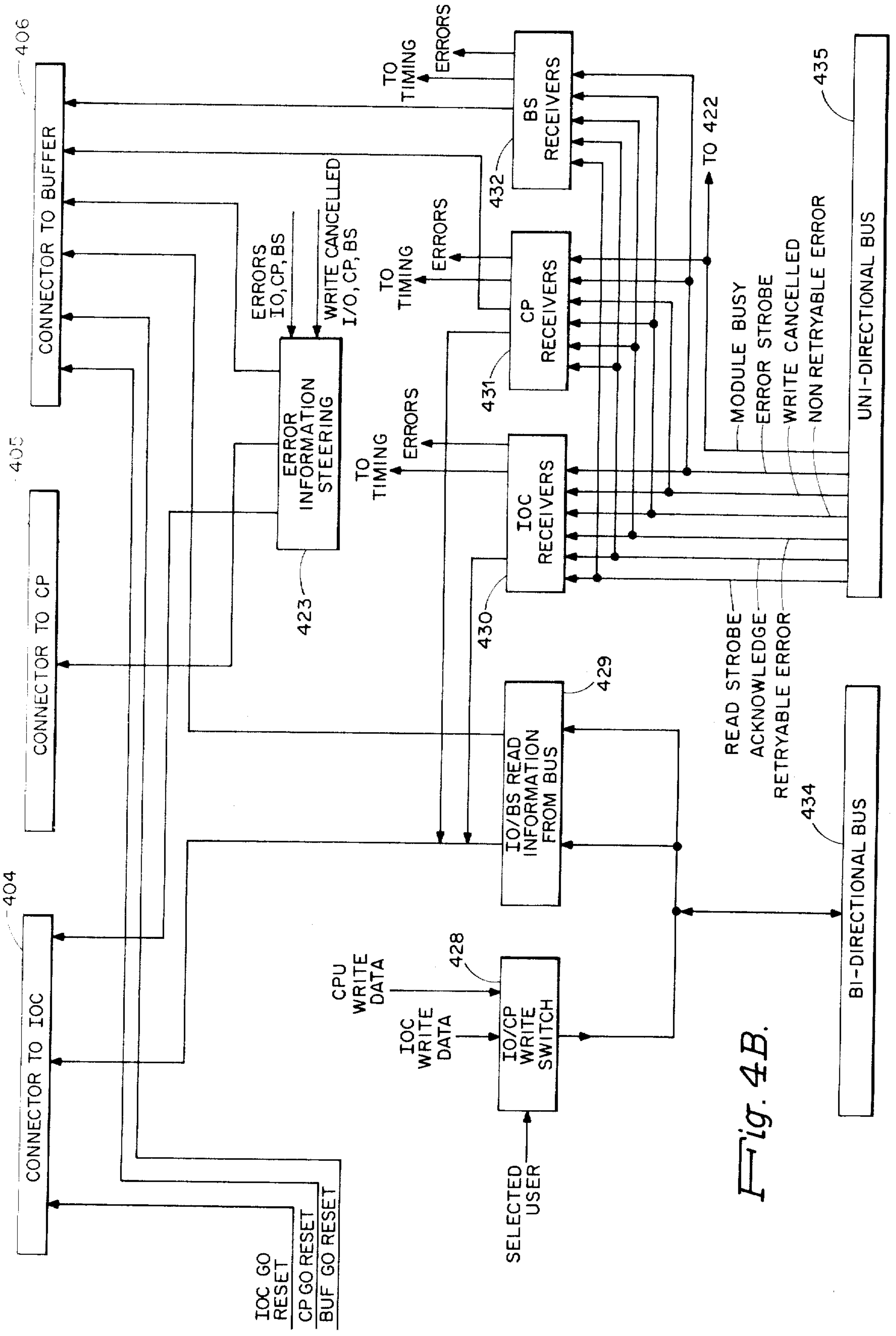

Referring now to FIGS. 4A and 4B there is shown an overall block diagram of the Main Store Sequencer. In order to view the Main Store Sequencer in proper perspective FIG. 4A should be viewed in conjunction with FIG. 4B, and with FIG. 4A being placed on the left of FIG. 4B. Three connectors 401, 402, and 403, receive signals from the IOC, the CPU and the buffer store (not shown in this Figure) respectively and distribute these signals to various elements of the MSS. Three connectors 404, 405 and 406 receive signals from the MSS unit and distribute these signals to the IOC, to the CPU and to the buffer store respectively. A connector 433 receives signals from various elements of the MSS and delivers them to main memory, not shown; while another connector 435 receives signals from main memory and delivers them to the MSS.

Assume that it is desired to perform a write operation into main memory from the IOC. Certain start parameters in the form of electronic signals are applied to the MSS via the IOC connector 401. The start parameters may include data signals, address signals, write mask signals and data parity signals. The address signals are applied to the main memory via an address select switch 411. Data from the IOC is transmitted via connector 401 to IO/CP Write Switch 428 and bidirectional bus 434. The data is checked for parity errors by parity checker 408 and is sent to the IO/CP Write Switch on its way to the bidirectional bus 434. Also the address information is checked for address parity errors by IOC Address Parity Checker 409, and is forwarded to the main memory via Address Select unit 411 and bus 433. If a data error is detected, a Write Abort signal is sent to the MMS. Write mask information is also applied to the connector 401 from the IOC and delivered to CP/IOC Write Mask Information Switch 415 and Write Mask Parity Checker 407. The Write Mask Information is then applied to the bus 433 via the switch 415 to indicate which of 8 bytes of data is to be written into memory. Simultaneously, the information assumed for the example above and a Go signal is delivered to the MSS from the IOC to the connector 401; whereupon the Go signal is applied to Priority Resolution Network 419 which in turn determines if the addressed memory module is busy or not and moreover arbitrates any simultaneous requests from other units and selects the particular memory module via Module Select Unit 420 and then informs the appropriate module selected that the information is ready for its use. When the main memory has received the information sent by the IOC an acknowledge signal is sent to the IOC via unidirectional bus 435, through IOC receivers 430 and connector 404. Moreover the main memory issues the appropriate module busy signal via unidirectional bus 435 to timing control 422. The timing control provides control functions such as determining when the write data is transmitted to the bus or when the error signals may be received from the main memory module via bus 435 and receivers 430, 431, or 432. Write data operations are similarly performed by the CPU utilizing its respective write data information, write mask information, address information, parity checkers and Go signals.

If it is desired that a particular unit such as the IOC perform a read operation the procedure is much like the write operation except that main memory will not write data and the Read-Write 208 signal will be false. The function of the Error Information Steering block 423, FIG. 4B is the MIU error registers. The output of all the parity checkers in the MIU feed the input to error registers, one for the IOC and one for the CP/Buffer. The input to the register is strobed when the parity checker outputs are valid. If an error is detected, the error is stored in the register and the appropriate user is informed. The register can be read by the CPU on command.

The MSS of FIGS. 4A and 4B has a reconfiguration network 418 which is capable of changing the normal configuration mode of main memory from a normal mode (i.e. a 4-way interleaved configuration) to a reconfigured mode (i.e. 2-way interleaved mode). If there is a failure in any one memory module, the memory modules may be reconfigured so that at least half the memory capacity of the original system (i.e. addresses 0 to X/2 −1 where X equals original memory capacity) is assured to function correctly. The remaining half of the reconfigured system also remains addressable (i.e. addresses X/2 to X−1) but access to this portion of the storage can produce unspecified results. However this retention of full addressing to all of memory substantially aids in diagnostic procedures because a portion of the memory is utilized by the user whereas the memory containing a fault is utilized by the diagnostician.

Referring to pages 19–21 of the above referenced patent application on "Buffer Store" to J. L. Curley et al. there is described in connection with FIG. 10 of that application the conventions for signal names, ascertions, and negations etc. that is also utilized in this application. FIGS. 5 through 7 will be described utilizing that convention. In addition the first letter of the signal or function names generally indicate the signal originates as follows:

*N* = Main Store Sequencer (MSS)
*B* = Buffer Store (BS)
*U* = A unit in the CPU
*M* = either IOC or MMS.

Figure 5A:
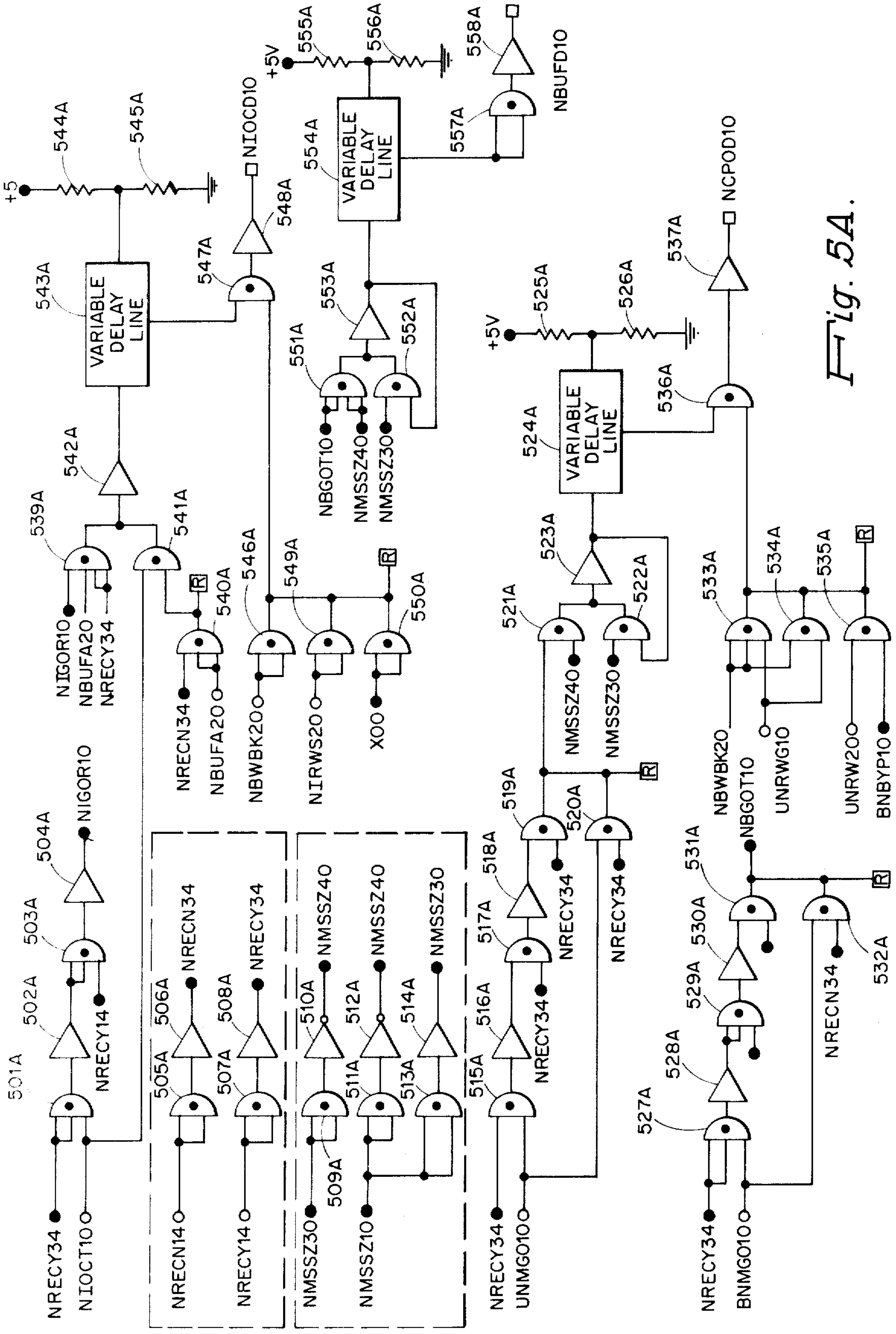
FIGS. 5A + 5B are detailed logic block diagrams of the priority resolving network.
Figure 5B:
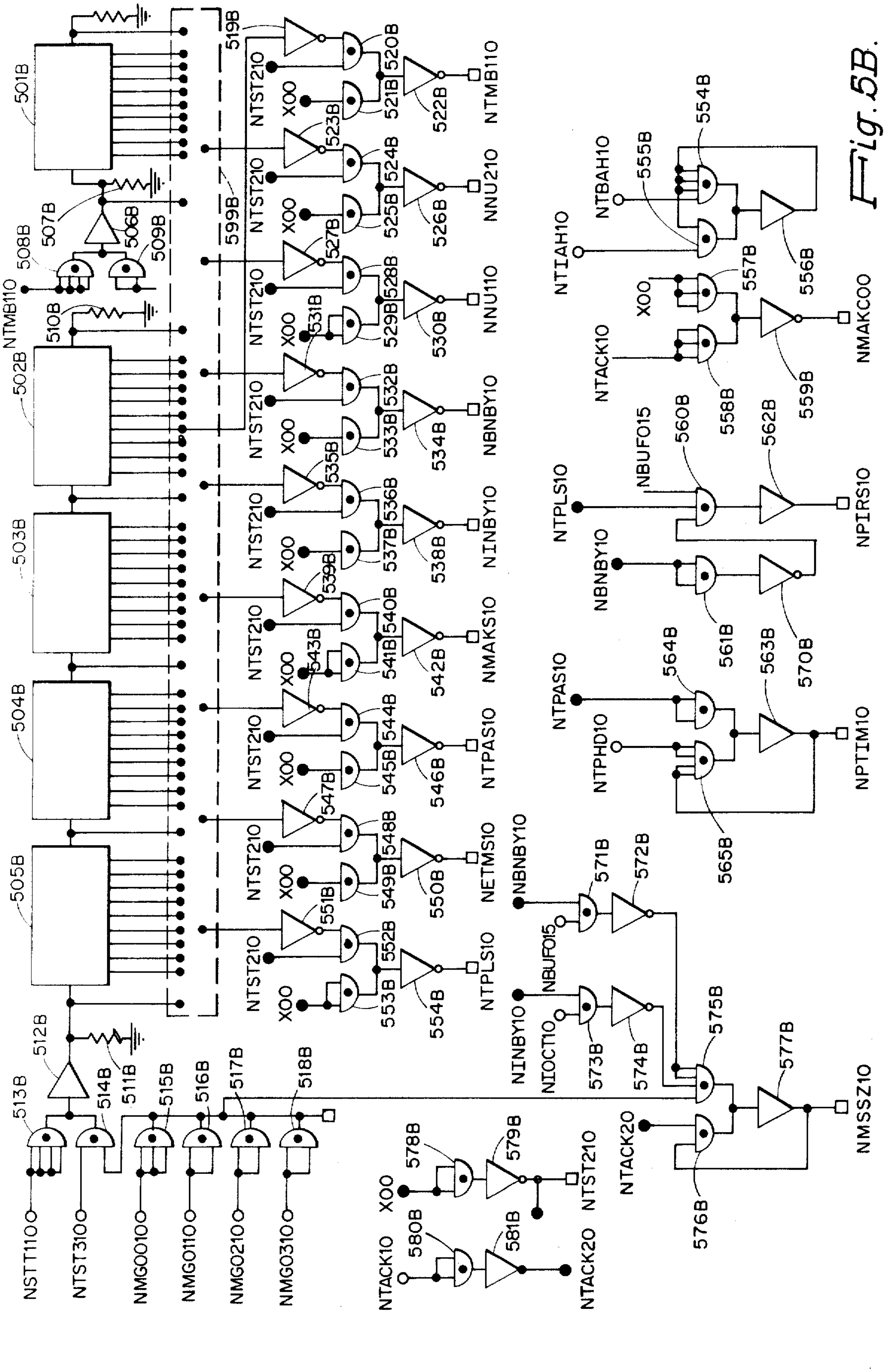

Referring to FIGS. 5A and 5B there is shown a detailed logic block diagram of the priority resolving network. With the conventions adopted and described in the prior referenced companion application and with the detailed logic block diagrams, taken together with the Glossary and definitions of the signal names, a person of ordinary skill in the art can practice the invention. For example, referring to FIG. 5A assume that the MSS has received a timing signal NIOCT10 (i.e. IOC Go signal) as one of its inputs which is applied to AND gates 501A and 541A. Assuming that the main memory is operating in normal mode; hence statement NRECY34 (See Glossary) is not true and the signal NRECY34 representing that statement is low, but signal NRECN34 applied to AND gate 540A is high since its representative statement is true. Moreover signal NBUFA20 is high since its representative statement Buffer is not the only user of the MSS allowed at this time is true. (It will be noted by referring to the Glossary and to the convention hereinbefore referenced that the statement NBUFA20 says buffer—BUF—is the only user—A (alone)—of the MSS—N—is not true—2—at the first level—0—). With both input signals applied to AND gate 540A high, it is enabled and its output is applied as one input of AND gate 541A. The other input of AND gate 541A is the signal NIOCT10 which is also high. With both inputs of AND gate 541A high then it too is enabled and the IOC Go signal continues through variable delay lines 543A and is applied to AND gate 547A. AND gate 546A is high if the previous cycle was a write by the CP and it is low if the previous cycle was a read. One legged AND gate 549A has applied a signal NIRWSZ0 which indicates that the signal of the IOC is to be allowed if the IOC is to perform a read operation and the signal of the IOC should be blocked if the IOC is to perform a write operation. Assuming for the purpose of this discussion that the IOC wants to do a read then the signal NIRWS20 is high and therefore AND gate 549A is enabled thus applying a second enabling signal to AND gate 547A. Therefore AND gate 547A is enabled and a high signal NIOCD10 (IOC Go signal delayed) results at its output.

Examining other figures to determine where the signal NIOCD10 is applied it will be noted that it is applied to AND gate 606A and 608A of FIG. 7. Both of these AND gates are OR'ed to one input terminal each of AND gates 605A and 610A. Examining the input signals of AND gate 606A it will be noted that one of its input signals is NRECY13. This signal indicates Main Memory is in a reconfigured mode. Since however it has been previously assumed that memory is in a normal mode, the signal NRECY13 on gate 606A is low. Because the input signal NRECN13 on one input terminal of AND gate 608A is high our attention is focused to AND gate 608A. So far therefore there are two high input signals on AND gate 608A—NRECN13 and NIOCD10. However examining the remainder of the input signals on AND gate 608A—i.e. MBA2740 and MBA2840—it will be noted according to the convention that has been adopted that the next to the last bit is even which indicates the signals MBA2740 and MBA2840 are high when the statement they represent is not true; therefore signals MBA2740 and MBA2840 are low and AND gate 608A cannot be enabled. A search is instituted for other AND gates that have applied as inputs the signals NRECN13 and NIOCD10. It is found that AND gate 620A has such input signals. Moreover it will be noted that there are two additional input signals MBA2740 and MBA2830, which indicate signals from the IOC to the main memory and are the address bits (i.e. bits 27 and 28) which select the main memory module desired. It will be noted further that signal MBA2740 according to the convention that has been adopted and explained supra is not high since its representative statement is false as indicated by the next to the last bit which is even. Although the statement representative of signal MBA2830 is true and the signal is high, AND gate 620A is not enabled; therefore once again the search for another AND gate with 4 enabling input signals, two of which are NRECN13 and NIOCD10, is continued. It will be noted that AND gate 620B on FIG. 7 has all its input signals NRECN13, NIOCD10, MNBA2730, and MBA2830, have their next to the last bit odd and represent statements which are true and therefore these signals are high. With all high inputs on AND gate 620B high, it will be enabled and will apply a high signal to one input terminal of AND gates 616B and 622B respectively. The other input signal on AND gates 616B and 622B respectively is MNBZ300 which makes the statement "Main Memory Module number 3 is not busy"; this statement is true, therefore the signal represented by this true statement (i.e. MNBZ300 is high) thus providing a second enabling signal for AND gates 616B and 622B. With both these AND gates enabled the MSS Go signal NMG0310 is generated (i.e. is high) and is available for signaling that the utilization of memory module number 3 (i.e. the fourth memory module) can be utilized. Thus it has been illustrated how the detailed logic block diagrams taken together in conjunction with the signal names and the convention adopted herein teach a person of ordinary skill in the art to practice the invention without resorting to undue experimentation.

Referring to FIG. 5B there is shown circuitry that is utilized to block buffer and CP assignments when the IOC has gained control of the MSS, as was the case in the previous example. In particular the NMG0 signals from the various main memory modules are collected by AND gates 515B-518B figured 5B and are OR'ed together and applied as one input signal of AND gate 575B. This input signal is high when any one of the AND gates 515B–518B is high. Other input signals to AND gate 575B are applied through inverters 572B and 574B through AND gates 571B and 574B respectively. Hence for AND gate 575B to be disabled all input signals on AND gates 571B and 573B must be high or in the alternative both input signals on either AND gate 571B or AND gate 573B must be high. With at least one input signal low on each of AND gates 571B and 573B respectively and with at least one AND gate 515B–518B enabled then AND gate 575B is enabled and produces a signal NMSSZ10 which indicates that the MSS is busy servicing the IOC. The NMSSZ signal is latched high via AND gate 576B and remains high until the MSS completes servicing the IOC unit. It will be noted that the NMSSZ signal is utilized to either inhibit or allow a Go signal issued by the buffer to a particular memory module as is shown on AND gates 551A and 552A of FIG. 5A. Similarly if the CPU or a unit in the CPU issues a Go signal indicated by signal UNMGO on AND gate 515A of FIG. 5A, a corresponding NMSSZ signal (i.e. MSS busy signal) is used to inhibit or allow the CP Go signal on AND gate 521A of FIG. 5A. It can be seen therefore that the buffer and the CPU are locked out when the IOC gains control of the MSS.

Referring to FIG. 5A the reconfigured mode of memory may be set up when necessary and may also be utilized by the IOC, the buffer or the CPU. For example if the reconfigured mode were being utilized then a signal NIGOR10 is generated at the output of amplifier 504A when the signals NRECY34 and NIOCT10 are high at the input terminals of AND gate 501A. NRECY is the signal indicating that the reconfigured mode is being utilized when this signal is high and of course the NIOCT signal is a request signal by the IOC for the memory service. With high signals NIGOR and NRECY applied to two of the input terminals of AND gate 539A it is enabled when the signal NBUFA20 signal is also high. The statement representative of the signal NBUFA20 says that the only user permitted is the buffer store is not true. When this statement is true, the signal representative of this statement must be high to enable AND gate 539A. With the signal NBUFA20 high, then AND gate 539A is enabled which provides a high delayed input signal to AND gate 547A which in turn is enabled in a manner previously discussed and provides a high output signal NIOCD10. This signal is then applied to the appropriate selection circuitry together with the reconfigured mode signal NRECY and the address bits NBA27 and NBA28 for selecting a particular mode. The selection process is similar to the normal mode previously discussed.

Once the MSS has been assigned to either the IOC, CPU or BS and competing units have been locked out as discussed supra the appropriate units must be notified of the assignments. To perform this task hardware is provided for generating assignment flag signals. (See FIG. 9) The assignment flag signals indicate that the CP, BS, or IOC has gained control of the MSS.

Figure 9:
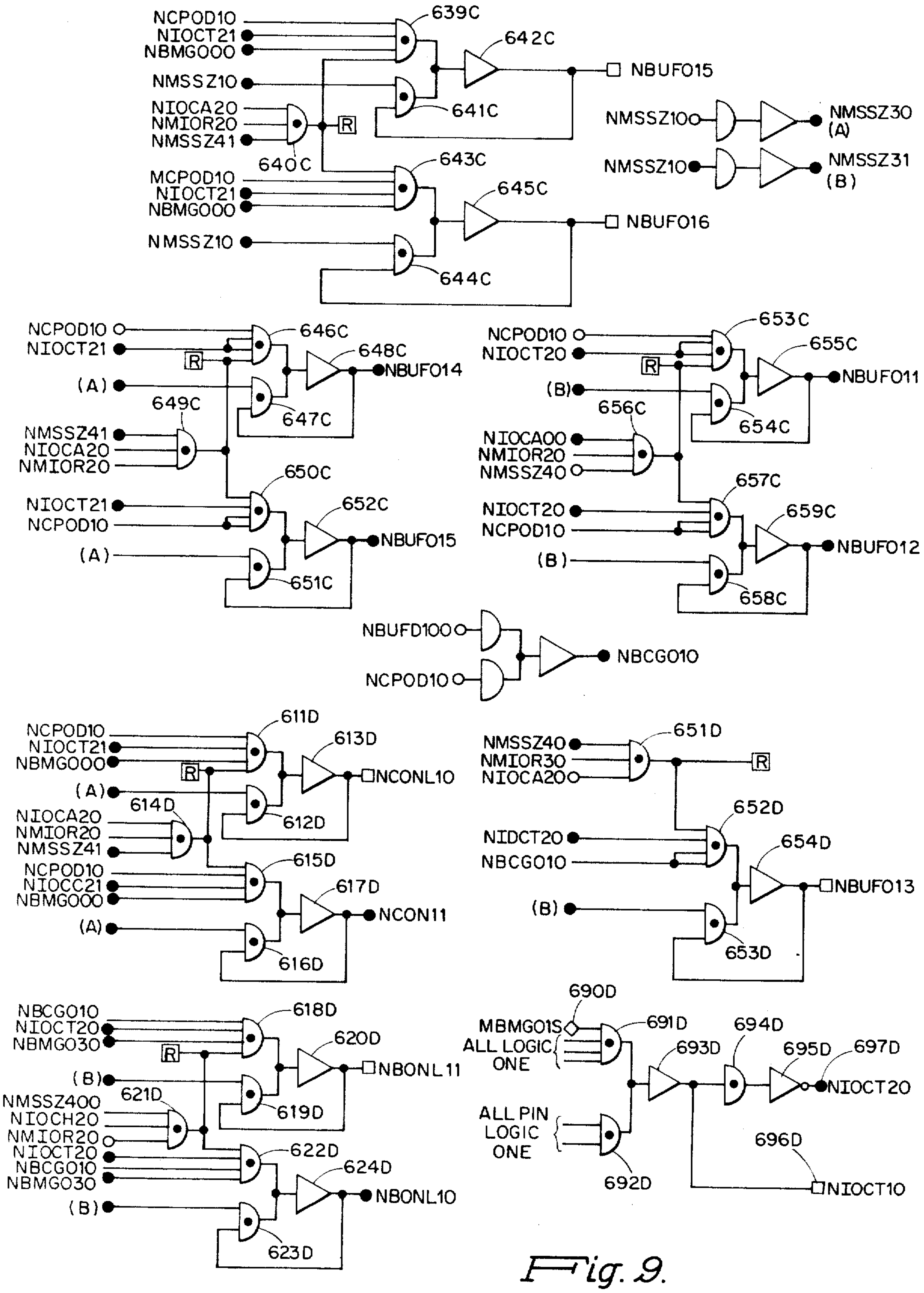
FIG. 9 is a detailed logic block diagram of the assignment flag and override network.

Referring to FIG. 9 it will be shown by example how one of these assignment signals is generated. Three signals are applied to AND gate 639C—NCPOD10, NIOCT21, NBMGO00. According to our convention adopted for this instant application when the statement NCPOD is true (indicated by second to the last bit being odd) then the signal NCPOD10 is high; when the statement NIOCT is not true (again indicated by an even number for the second to the last bit) then the signal MIOCT21 is high; similarly the signal NBMG0 on the third leg of AND gate 639C is high when the statement representative of that signal is not true i.e. when NBMGO is not present then that signal is high. (The statement or function representative by the signal NCPOD is the CP Go delay signal; the function or statement representative of NIOCT is the IOC Go signal derived from a timing signal; the function or statement representative of the NBMGO signal is the buffer Go signal). Gate 640C is enabled when the three signals NIOCA, NMIOR, NMSSZ are high. These signals are high when the statement representative of these signals are not true as indicated by next to last bit being even. The statement or function represented by signal NIOCA is IOC only; the statement or function represented by signal NMIOR is a request to reserve the MSS for the IOC even though the IOC has not issued a Go signal. When all these statements are not true then the signal representative of these statements applied to AND gate 640C are high. With these signals high AND gate 640C is enabled and applies a high signal as a fourth input to AND gates 639C and 643C. Hence AND gate 639C is enabled which applies a high signal to amplifier 642C which in turn generates the NBUFO15 signal which says that the statement is true that the MSS is assigned to the buffer and therefore the signal is high. The signal will remain high as long as the NMSSZ signal or MSS busy signal is applied as one input to AND gate 641C. The other input of AND gate 641C is the feed-back of the NBUFO signal. (It was seen previously how the MSS busy signal (NMSSZ) was generated; here one application of the MSS busy signal (NMSSZ) to exclude competing units from acquiring control of the MSS, is shown.

Once a particular unit such as the IOC, or CPU has acquired control of the MSS, it has been shown with respect to FIG. 3 that the MSS may issue a Go signal to the main memory module address.

However there are times when it is desirable to override the assignment to either the CPU or the buffer store and give control of the MSS to the IOC. This may be done even though the CPU or the BS has been assigned the MSS, but it must be done before the MSS has issued a busy signal which locks out other units. The over-ride hardware for performing this task is shown on FIGS. 6 and 9. Refer now to FIGS. 6 and 9 and assume that the CPU or BS has issued a Go signal which has been received by the MSS before receiving a Go signal from any other competing unit, but because the particular main memory module desired is not available the CPU or BS unit is waiting on that module to become available. Further assume that while the CPU or BS is waiting for the memory module to become available the IOC desires to obtain control of the MSS and enter the main memory module when it no longer is busy. Under these conditions even though the CP or BS issued a Go signal and it was received by the MSS before receiving the Go signal of the IOC unit, it is possible to over-ride the Go signal of the CPU or BS and deliver control of the MSS to the IOC unit when the memory module desired becomes available.

To illustrate by example refer again to FIGS. 9 and 7 and more particularly the gate 624D, and assume that the BS has requested service from module 0 of MMS, but module 0 is busy. This is indicated at AND gate 603A of the module select network of FIG. 7 as follows: signal NBONL10 which indicates that the BS is assigned control of the MSS is high; signal BNA2840 indicating that buffer address bit 28 is not true; (the top input terminal of AND gate 603A is high when either output of AND gates 601A or 602A are high), in this example signal BNA2740 is high since the statement it represents is true and says that buffer address bit 27 is not true (i.e. is 0), moreover signal NRECN13 indicating the mode of operation is in the normal mode and not the reconfigured mode, is high; hence AND gate 601A is enabled making the top input terminal of AND gate 603A high. However since the assumption was made for this example that the buffer desired to access module 0 but that module 0 was busy, signal MNBZ000 on AND gate 603A is low and therefore AND gate 604A is not enabled and signal NMGOO1T is low, and the main memory module 0 Go signal is not issued i.e. module 0 cannot be accessed.

Assume now that at one clock time later the IOC makes a request for access to the same memory module on which the BS is waiting. It has been seen that the BS has been assigned control of the MSS and waiting on the MMS: the IOC under these conditions can override the BS control of the MSS and take control and access module 0 of the MMS when it becomes available. Referring to FIG. 9 an IOC Go signal MBMB0IS is applied to one input terminal of AND gate 691D through a pin 690D. When all other input signals coming from the IOC and applied to AND gate 691D are high it becomes enabled thus applying a high input signal to amplifier 693D. At the output of amplifier 693D the signal divides into two paths. One path takes the signal through inverter 695D producing a signal NIOCT20 which is low, whereas the other path produces a signal NIOCT10 which is high. The signal NIOCT20 is applied to one input terminal of AND gate 622D thus disabling AND gate 622D and causing the signal NBONL10 which indicates the BS is assigned control of the MSS, to go low. This low NBONL10 signal is applied to AND gate 603A (FIG. 7) which as was previously shown was high waiting for MNBZ000, the signal indicative that module 0 of the MMS is busy, to go high. However at this point in time since the signal NBONL10 is low, the BS no longer has control of the MSS and even if the MNBZ000 signal were to become high indicating module 0 is no longer busy, the BS could not access MMS. Thus it is seen how the IOC has prevented the BS from accessing MMS. It will now be shown, by example, how the IOC obtains control.

Referring again to FIG. 9 it was shown how two NIOCT signals were generated at pins 696D and 697D one true one false. The signal which is high NI0CT10 is applied to input terminals of AND gates 501A and 541A of FIG. 5A. The signal NRECN34 is high since this is not a reconfigured mode and also NBUFA20 will be high since the statement representation of that signal (i.e. buffer is the only user of the MSS, not) is true. With both signals NRECN34 and NBUFA20 applied to AND gate 540A it will be enabled thus applying another high signal as an input to AND gate 541A. Hence both input signals to AND gate 541A are high thus enabling it and providing a high signal to variable delay line 543A via amplifier 542A, which high signal is then applied to one input terminal of AND gate 547A. The other input terminal of AND gate 547A is high if any of AND gates 546A, 549A or 550A are high. Assuming the IOC desires to do a read operation; then AND gate 549A is enabled when signal NIWBK20 becomes high. The high signal from one leg AND gate 549A is applied to another input terminal of AND gate 547A thus enabling it, and generating the signal NI0CD10 via amplifier 548A. Signal NI0CD10 (i.e IOC Go signal delayed) is applied to AND gate 608A of FIG. 7. The other input signals applied to AND gate 608A will also be high. These input signals are as follows: NRECN13 indicating normal mode of operation for main memory; MBA2740 and MBA2840 indicating IOC address bits 27 and 28 are both high and therefore selecting MMS module 0. With all inputs of AND gate 608A high it will be enabled applying a high input signal to AND gate 605A. When the other input signal on AND gate 605A MNBZ000 becomes high (i.e. MMS module 0 not busy) then it will be enabled permitting the IOC to gain control of the MMS module 0. Thus it is seen how the IOC can override and obtain control of the MSS and MMS.

In attempting to override control of the CPU or BS, however, it is possible for MMS module 0 to become available during the interval that the IOC is in the process of overriding the CPU or BS. Under these conditions a period of indecision and possible wrong indication as to who has gained access to main memory and is being serviced by MSS would result. Consider for example the following set of conditions which would give a false indication. A main memory module Go signal for module 0 NMG0010 is issued through AND gate 610A and amplifier 612A when MNBZ000 signal (i.e. MMS module 0 busy not) becomes high, during the period the MSS is assigned to the BS and during the interval the IOC is attempting to override the BS.

Figure 10:
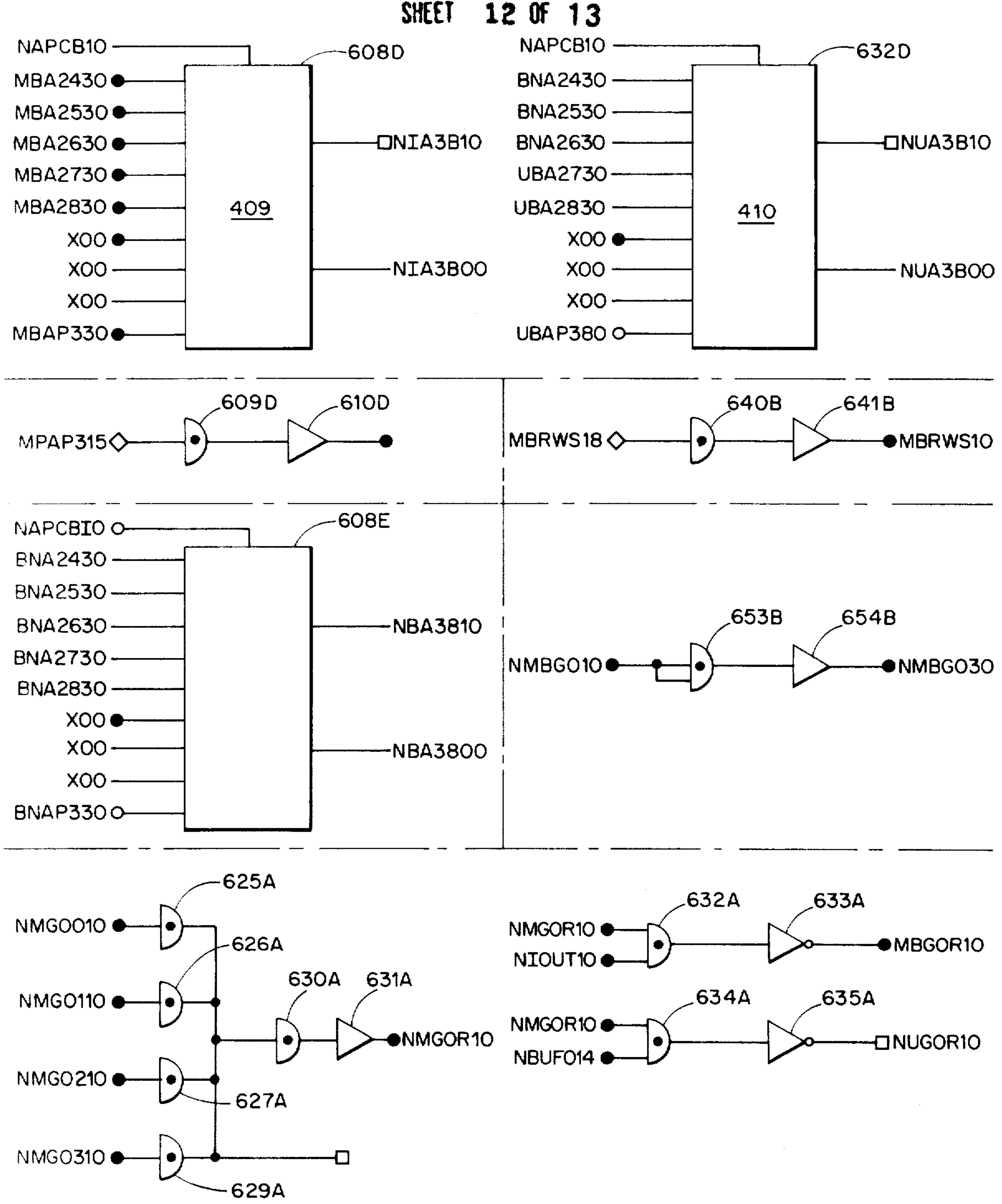
FIG. 10 is a detailed logic block diagram showing various features of the invention.
Figure 11:
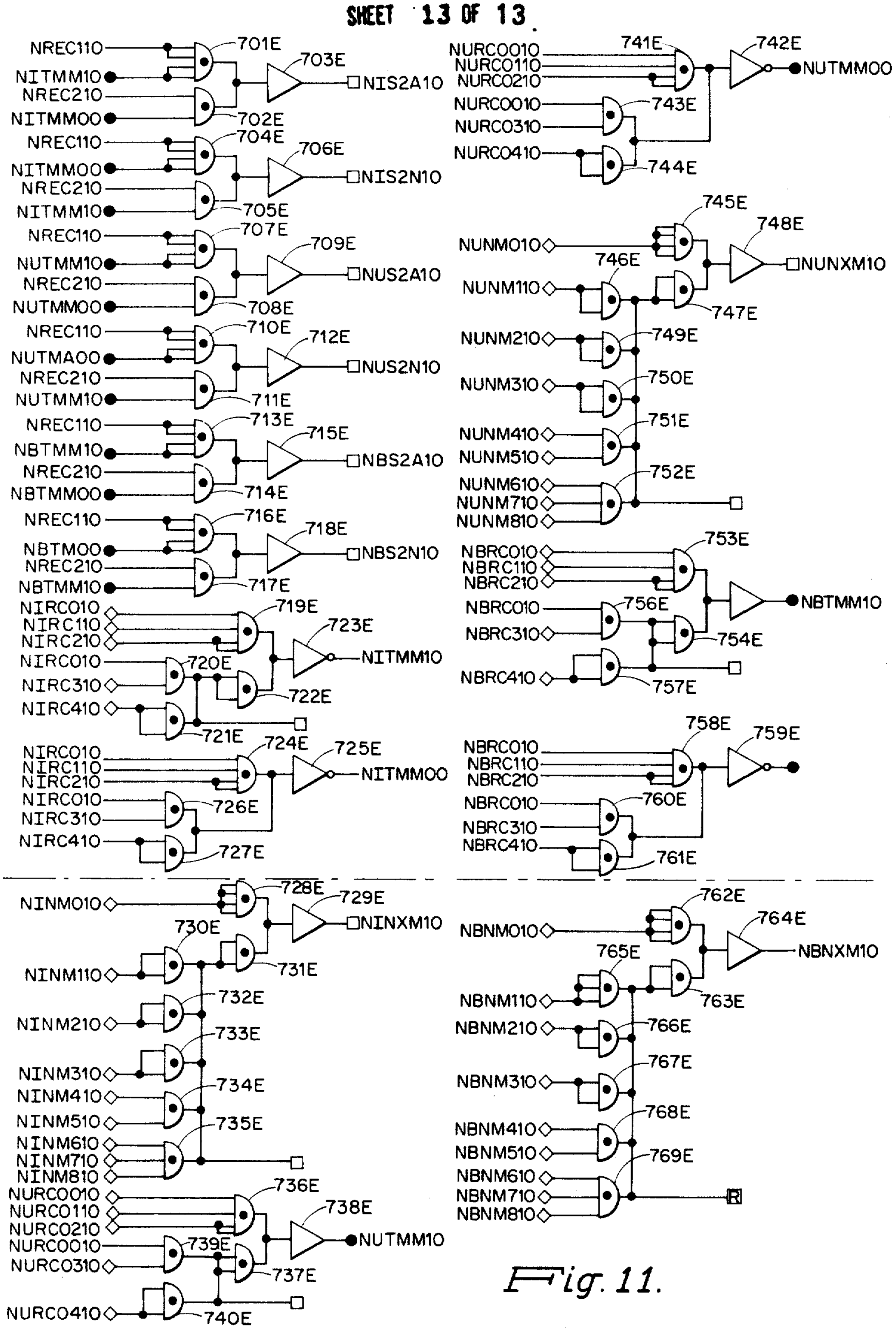
FIG. 11 is a detailed logic block diagram of the reconfiguration network.

Referring to FIG. 10 the NMG0010 signal is applied to AND gate 625A which enables AND gate 630A and generates signal NMG0RI0 (i.e. Go reset signal to MMS). The NMG0R10 signal is applied to one input terminal of AND gate 634A, and because the other terminal of AND gate 634A has the signal NBUF014 applied to it and because this is still high, since the MSS is still assigned to the BS, AND gate 634A is enabled issuing a Go reset NUGOR10 signal to the CPU through inverter 635A indicating that the MSS has begun to service the BS when in fact it is the IO that the MSS is about to be serviced. The override assurance network of FIG. 6 prevents this false indication. The function of the override assurance network is to prevent the main memory module busy signal from changing state at that critical period of indecision.

Figures 6A, 6B:
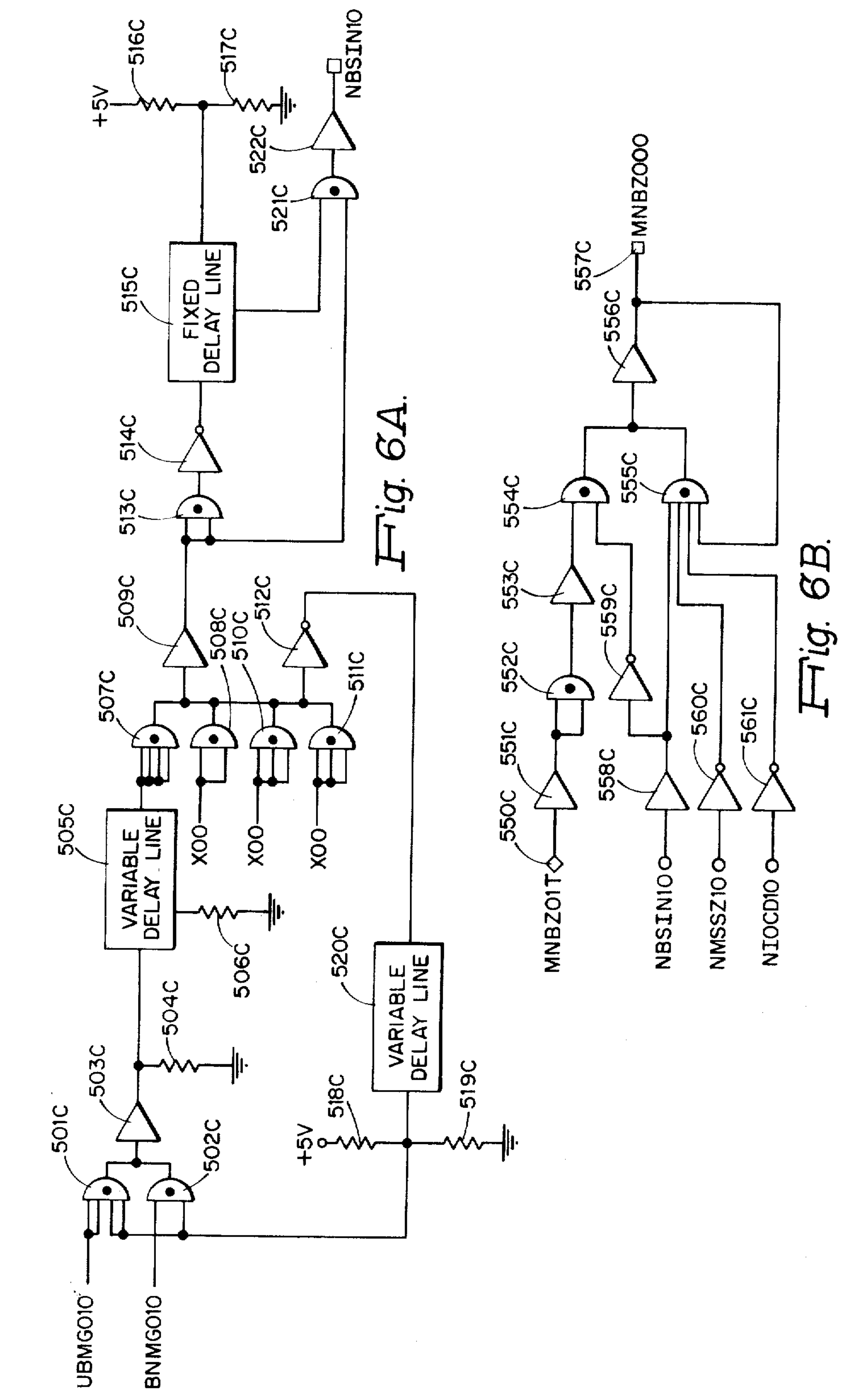
FIGS. 6A + 6B are detailed logic block diagrams of the override ascertain network, for ascertainity that the CPU or BS is overriden by the IOC in any override attempt.
Figure 7:
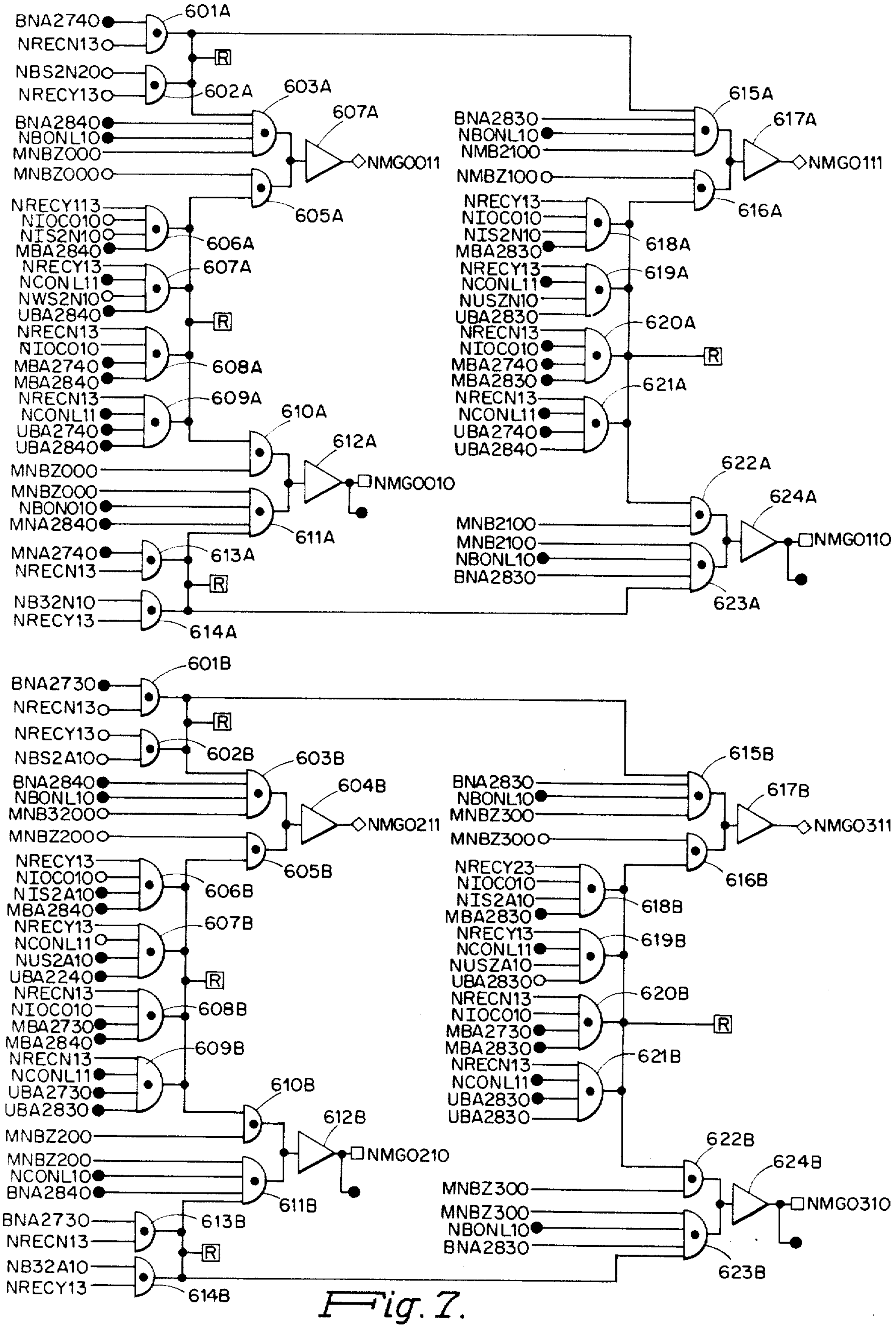
FIG. 7 is a detailed logic block diagram of the module select network.
Figure 8:
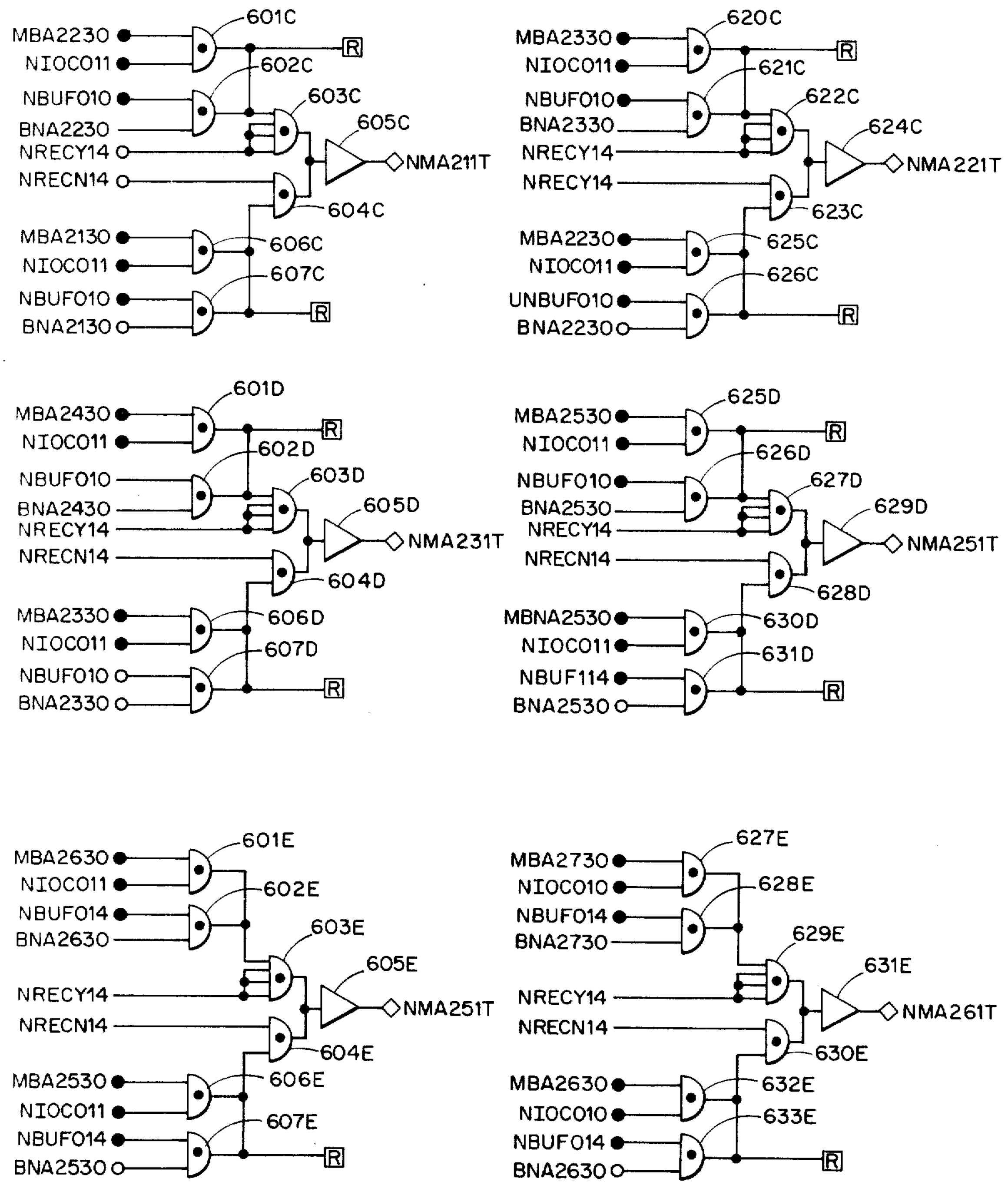
FIG. 8 is a detailed logic block diagram of the address select network.

Referring now to FIG. 6B the Go signal of the CPU or buffer store applied to AND gates 501C or 502C respectively is delayed through variable delay line 505C and is applied to an input terminal of AND gate 507C. Because AND gate 507C has all its input terminals tied together it is enabled when its only input is high. AND gates 508C, 510C and 511C are not utilized in the network indicated by X00. When AND gate 507C is enabled its output signal is applied to amplifier 509C and inverter 512C. The signal from the output of inverter 512C is applied back to AND gates 501C and 502C respectively. Therefore AND gates 501C and 502C are disabled when AND gate 507C is enabled. The variable delay lines 505C and 520C provide a typical loop delay for the loop just described of about 115 nanoseconds. The signal from AND gates 507C which is applied to amplifier 509C and onto the loop comprised of AND gates 513C, 514C, delay line 515C, AND gate 521C and amplifier 522C generates a signal NBSIN10 which is typically delayed by 50 nanoseconds. Hence for every 150 nanoseconds time interval a 50 nanosecond pulse NBSIN10 is generated. (Note that delay line 515C taken in conjunction with the output of amplifier 509C produce a 50 nanosecond pulse whereas variable delay line 505C taken in conjunction with variable delay line 520C produce a 150 nanosecond delay. The buffer sample inhibit signal (NBSIN) is utilized for a portion of a clock pulse to sample the main memory bus lines 317 shown on FIG. 3, and to apply the signal to a latch circuit FIG. 6B to maintain the state of the busy lines in the state that they were found i.e. if the busy lines were busy it would maintain them in a bush state and if they were not busy it would maintain them in a not busy state for an extension of approximately 15 nanoseconds beyond the clock pulse). This would provide a sufficient time to eliminate any uncertainty period during the time when the IOC desired to over-ride the CPU or buffer store; therefore the busy lines are not activated to to switch state and indicate the MSS is busy, thus locking out the IOC before it has a chance to over-ride the CPU or BS.

Referring to FIG. 6B the signal NBSIN10 is applied to amplifier 558C and inverter 559C. The signal from amplifier 558C is applied to one input terminal of AND gate 555C. Amplifier 556C together with AND gate 555C form a latch circuit which permits the MMS module 0 busy not signal MNBZ000 to be stored and circulate in the latch circuit as long as all input signals to AND gate 555C remain high. If on the other hand the MMS module 0 is busy (i.e. signal MNBZ000 is low and MNBZ01T is high) the inverted signal NBSIN10 through inverter 559C will disable AND gate 554C causing signal MNBZ000 to be low, indicating MMS module 0 is busy, and this indication will remain so long as signal NBSIN10 is high which is typically 50 nanoseconds—a time sufficient to overcome the critical period of indecision.

Having shown and described a preferred embodiment of the invention, those skilled in the art will realize that many variations and modifications may be made to produce the described invention and still be within the spirit and scope of the claimed invention.

GLOSSARY OF TERMS

| SIGNAL LOGIC NAME | DEFINITIONS |
|---|---|
| NBUFØ11 | BUFFER OR CP ASSIGNED FLAG SIGNAL 1 |
| NBUFØ12 | " " " 2 |
| NBUFØ13 | " " " 3 |
| NBUFØ15 | " " " 5 |
| NBUFØ16 | " " " 6 |
| NMA211R | MMS ADDRESS BITS 21 |
| NMA221R | " " " 22 |
| NMA231R | " " " 23 |
| NMGOØ1Ø | MAIN MEMORY MODULE Ø GO SIGNAL |
| NMGO11Ø | " " " 1 GO SIGNAL |

| | |
|---|---|
| NMG021Ø | " " " 2 GO SIGNAL |
| NMG031Ø | " " " 3 GO SIGNAL |
| MNBZØØØ | MAIN MEMORY MODULE Ø BUSY-NOT |
| MNBZ1ØØ | " " " 1 BUSY-NOT |
| MNBZ2ØØ | " " " 2 BUSY-NOT |
| MNBZ3ØØ | " " " 3 BUSY-NOT |
| UBAP33Ø | CP ADDRESS PARITY BIT 3 |
| NUA3B1Ø | CP ADDRESS BYTE 2 PARITY CHECK |
| UBA283Ø | CP ADDRESS BIT 28 |
| NCONL1Ø | CP ONLY ASSIGNED FLAG SIGNAL |
| NCPOD1Ø | CP GO DELAYED |
| NUS2N1Ø | CP LOWER MODULE SELECT FOR RECONFIGURED MODE |
| NUS2A1Ø | CP UPPER MODULE SELECT FOR RECONFIGURED MODE |
| NUGOR1Ø | CP GO RESET SIGNAL |
| MBAP23Ø | IOC ADDRESS PARITY CHECK BIT 2 |
| NIA3B1Ø | IOC ADDRESS BYTE 3 PARITY CHECK |
| NIOCØ1Ø | IOC CONTROL FUNCTION ASSIGNMENT FLAG |
| NIOCA2Ø | IOC ALONE NOT |
| NMIOR2Ø | IOC RESERVATION NOT |
| NIOCD1Ø | IOC GO DELAYED |

| SIGNAL LOGIC NAME | DEFINITIONS |
|---|---|
| NIS2N1Ø | IOC LOWER MODULE SELECT FOR RECONFIGURED MODE |
| NIS2A1Ø | IOC UPPER MODULE SELECT FOR RECONFIGURED MODE |
| NIOCT1Ø | IOC GO TO MSS |
| NBUFA2Ø | BUFFER ALONE-NOT |
| BNMG01Ø | BUFFER GO |
| BNAP33Ø | BUFFER ADDRESS PARITY BIT 3 |
| NBA3B1Ø | BUFFER ADDRESS BYTE 3 PARITY CHECK |
| NBONL11 | BUFFER ONLY ASSIGNMENT FLAG SIGNAL |
| NMBG01Ø | IOC GO SIGNAL TO BUFFER |
| MBRWS1Ø | IOC WRITE SIGNAL |
| NBS2N1Ø | BUFFER LOWER MODULE SELECT FOR RECONFIGURED MODE |
| NBS2A1Ø | BUFFER UPPER MODULE SELECT FOR RECONFIGURED MODE |
| NRECN13 | RECONFIGURATION MODE NOT |

| | |
|---|---|
| NRECY13 | MMS RECONFIGURED YES (Amplifier 3) |
| NRECN14 | MMS NON-RECONFIGURED MODE |
| NRECY14 | MMS RECONFIGURED YES (Amplifier 4) |
| NMSSZ1Ø | MMS BUSY |
| NAPCB1Ø | ADDRESS PARITY CHECK INHIBIT |
| NIAPC1Ø | IOC ADDRESS PARITY CHECK INHIBIT |
| NAPMD1Ø | ADDRESS PARITY MODE |
| NAP3Ø1Ø | IOC ADDRESS BYTE 3 PARITY CHECK |
| NMSSZ42 | MSS NOT BUSY |
| UBA273Ø | CP ADDRESS BIT 27 |
| NMA211T | ADDRESS BIT 21 TO MMS INTERFACE SIGNAL |
| NMA221T | " " 22 TO MMS INTERFACE SIGNAL |
| NMA231T | " " 23 TO MMS INTERFACE SIGNAL |
| NMA241T | " " 24 TO MMS INTERFACE SIGNAL |
| NMA251T | " " 25 TO MMS INTERFACE SIGNAL |
| NMA261T | " " 26 TO MMS INTERFACE SIGNAL |

| SIGNAL LOGIC NAME | DEFINITIONS |
|---|---|
| NMGOØ1T | INTERFACE GO SIGNAL TO MSS MODULE 0 |
| NMGO11T | " " " " " " 1 |
| NMGO21T | " " " " " " 2 |
| NMGO31T | " " " " " " 3 |
| XN21 | INTERFACE GO SIGNAL NOT USED TO MSS MODULE |
| XN21 | " " " " " " " " |
| MBA211S | IOC ADDRESS TO MSS BIT 21 |
| NMGOR1S | GENERAL GO RESET INTERNAL MSS |
| MBA221S | IOC ADDRESS BIT 22 TO MSS |
| MBA231S | " " " 23 TO MSS |
| MBA241S | " " " 24 TO MSS |
| MBA251S | " " " 25 TO MSS |
| MBA261S | " " " 26 TO MSS |
| MBA271S | " " " 27 TO MSS |
| MBA281S | " " " 28 TO MSS |
| NXU | NOT USED |
| MBAP21S | IOC ADDRESS PARITY BIT 2 TO MSS |

| | |
|---|---|
| MBAP31S | " " " " 3 TO MSS |
| MBG0R1S | MSS GO RESET TO IOC |
| MBRWS1S | IOC READ OR WRITE TO MSS |
| MBMG01S | IOC GO SIGNAL THRU MSS TO BUFFER |
| MMP481Ø | IOC WRITE DATA TO THE PARITY CHECKER BIT 48 |
| MMP491Ø | " " " " " " " " 49 |
| MMP501Ø | " " " " " " " " 50 |
| MMP511Ø | " " " " " " " " 51 |
| MMP521Ø | " " " " " " " " 52 |
| MMP531Ø | " " " " " " " " 53 |
| MMP541Ø | " " " " " " " " 54 |
| NBCG0IØ | BUFFER OR CPU GO |

| SIGNAL LOGIC NAME | DEFINITIONS |
|---|---|
| MMP551Ø | IOC WRITE DATA TO THE PARITY CHECKER BIT 55 |
| MMP561Ø | " " " " " " " " 56 |
| MMP571Ø | " " " " " " " " 57 |
| MMP581Ø | " " " " " " " " 58 |
| MMP591Ø | " " " " " " " " 59 |
| MMP6Ø1Ø | " " " " " " " " 60 |
| MMP611Ø | " " " " " " " " 61 |
| MMP621Ø | " " " " " " " " 62 |
| MMP631Ø | " " " " " " " " 63 |
| MMPP71Ø | IOC WRITE DATA PARITY CHECK BYTE 7 |
| NIBPØ1Ø | IOC BYTE Ø PARITY ERROR CHECK |
| NIBP11Ø | " " 1 " " " |
| NIBP21Ø | " " 2 " " " |
| NIBP31Ø | " " 3 " " " |
| NIBP41Ø | " " 4 " " " |
| NIBP51Ø | " " 5 " " " |
| MMBP61Ø | IOC WRITE DATA BYTE 6 PARITY |
| NBBPØ1Ø | BUFFER BYTE Ø PARITY ERROR CHECK |
| NBBP11Ø | " " 1 " " " |
| NBBP21Ø | " " 2 " " " |
| NBBP31Ø | " " 3 " " " |

| | |
|---|---|
| NBBP41Ø | " " 4 " " " |
| NBBP51Ø | " " 5 " " " |
| NBBP61Ø | " " 6 " " " |
| NBBP71Ø | " " 7 " " " |
| BNP481Ø | CP WRITE DATA TO THE PARITY CHECKER BIT 48 |
| BNP491Ø | " " " " " " " " 49 |
| BNP501Ø | " " " " " " " " 50 |
| BNP511Ø | " " " " " " " " 51 |
| BNP521Ø | " " " " " " " " 52 |
| BNP531Ø | " " " " " " " " 53 |
| BNP541Ø | " " " " " " " " 54 |
| BNP551Ø | " " " " " " " " 55 |

| SIGNAL LOGIC NAME | DEFINITIONS |
|---|---|
| BNP561Ø | CP WRITE DATA TO THE PARITY CHECKER BIT 56 |
| BNP571Ø | " " " " " " " " 57 |
| BNP581Ø | " " " " " " " " 58 |
| BNP591Ø | " " " " " " " " 59 |
| BNP601Ø | " " " " " " " " 60 |
| BNP611Ø | " " " " " " " " 61 |
| BNP621Ø | " " " " " " " " 62 |
| BNP631Ø | " " " " " " " " 63 |
| BNPP71Ø | CP WRITE DATA PARITY CHECK BYTE 7 |
| NICYC1Ø | IOC CYCLE INTERNALLY GENERATED |
| NCCYC1Ø | CP CYCLE INTERNALLY GENERATED |
| NBCYC1Ø | BUFFER CYCLE INTERNALLY GENERATED |
| NIETM1Ø | IOC WRITE ABORT LATCH |
| NINET1Ø | IOC RETRYABLE ERROR LATCH |
| NIAPB1Ø | IOC PARITY CHECK INHIBIT |
| MNIME1Ø | IOC MASK PARITY ERROR |
| NIWES1Ø | NON-RETRYABLE ERROR STROBE |
| NIOCØ34 | IOC CONTROL SIGNAL TO MSS |
| NCETM1Ø | CP WRITE ABORT LATCH |
| NCNET1Ø | CP RETRYABLE ERROR LATCH |
| NUAPB1Ø | CP PARITY CHECK INHIBIT |

| | |
|---|---|
| MNCME1Ø | CP MASK PARITY ERROR |
| NCWES1Ø | NON-RETRYABLE ERROR STROBE |
| NCPØØ36 | CP ASSIGNED CONTROL OF THE MSS |
| MNWAB1Ø | IOC WRITE ABORT |
| UBWAB3Ø | CPU WRITE ABORT |
| UNINT3Ø | CP INITIALIZE |
| NIDPC11 | INHIBIT DATA PARITY CHECK |
| NBETM1Ø | BUFFER WRITE ABORT LATCH |
| NMAKCØØ | MEMORY ACKNOWLEDGE CONTROL NOT |

| SIGNAL LOGIC NAME | DEFINITIONS |
|---|---|
| NIAKS2Ø | IOC ACKNOWLEDGE NOT |
| NBAKS2Ø | BUF. " " |
| NCAKS2Ø | CPU " " |
| NINXM1Ø | IOC NON-EXISTENT MEMORY CHECK |
| NIOCT1Ø | IOC GO SIGNAL |
| NUNXM1Ø | CP NON-EXISTENT MEMORY CHECK |
| NCPØØ16 | CP ASSIGNED CONTROL OF THE MSS |
| NBNXM1Ø | BUFFER NON-EXISTENT MEMORY CHECK |
| NBUFØ15 | BUFFER ASSIGNED CONTROL OF THE MSS |
| NUSEC1Ø | CP SINGLE ERROR CORR. |
| NBNER1Ø | BUFFER NON-RETRYABLE ERROR |
| NBERS1Ø | BUFFER ERROR STROBE |
| NBRER1Ø | BUFFER RE-TRYABLE ERROR |
| NIBP61Ø | IOC BAD BYTE 6 PARITY CHECK |
| NIBP71Ø | " " " 7 " " |
| NBBP61Ø | BUFFER BYTE 6 PARITY ERROR CHECK |
| NBBP71Ø | " " 7 " " " |
| NMACK1Ø | IOC ACKNOWLEDGE |
| NBACK1Ø | BUF. " |
| NUACK1Ø | CPU " |
| NMBZØØØ | MMS MODULE Ø BUSY NOT |
| NMBZ1ØØ | " " 1 " " |
| NMBZ2ØØ | " " 2 " " |
| NMBZ3ØØ | " " 3 " " |

| | |
|---|---|
| NTACK1Ø | MMS ACKNOWLEDGE WHICH RESETS MSS BUSY |
| NBNEM1Ø | BUFFER NON-EXISTENT MEMORY CHECK |
| NIAPC1Ø | INHIBIT ADDRESS PARITY CHECK |
| NIDPC1Ø | INHIBIT DATA PARITY CHECK |
| NIDPC3Ø | " " " " |

| SIGNAL LOGIC NAME | DEFINITIONS |
|---|---|
| NBRDS1Ø | BUF/CP READ STROBE |
| NREC11Ø | RECONFIGURATION MODE R1 |
| NREC21Ø | RECONFIGURATION MODE R2 |
| NRECY11 | MMS RECONFIGURATION MODE DRIVER 1 |
| NRECY12 | " " " " 2 |
| NRECY13 | " " " " 3 |
| NRECY14 | " " " " 4 |
| NRECN11 | MMS NON-RECONFIGURATION MODE DRIVER 1 |
| NRECN12 | " " " " " 2 |
| NRECN13 | " " " " " 3 |
| NRECN14 | " " " " " 4 |
| NBNET1Ø | BUF. NON-RECONFIGURATION ERROR LATCH STROBE 1 |
| MBAØ83Ø | IOC TO MSS ADDRESS BIT 8 |
| MBAØ930 | " " " " " 9 |
| MBA1Ø3Ø | " " " " " 10 |
| MBA113Ø | " " " " " 11 |
| MBA123Ø | " " " " " 12 |
| MBA133Ø | " " " " " 13 |
| MBA143Ø | " " " " " 14 |
| NBS2A1Ø | BUF. UPPER MODULE SELECT IN RECONFIGURED MODE |
| NBS2N1Ø | BUF. LOWER MODULE SELECT IN RECONFIGURED MODE |
| NINXM1Ø | IOC NON-EXISTENT MEMORY CHECK |
| NUNXM1Ø | CP " " " " |
| NBNXM1Ø | BUF. " " " " |
| NINM21Ø | IOC NON-EXISTENT MEMORY CHECK BIT 2 |
| NINM11Ø | " " " " " " 1 |
| NINMØ1Ø | " " " " " " Ø |
| XØØ | GROUND |

| | |
|---|---|
| NRCG1ØØ | LOGICAL 1 |
| MBAØ83Ø | IOC TO MSS ADDRESS BIT 8 |
| MBAØ93Ø | " " " " " 9 |

| SIGNAL LOGIC NAME | DEFINITIONS |
|---|---|
| MBA1Ø3Ø | IOC TO MSS ADDRESS BIT 1Ø |
| MBA113Ø | " " " " " 11 |
| MBA123Ø | " " " " " 12 |
| MBA133Ø | " " " " " 13 |
| MBA143Ø | " " " " " 14 |
| NIRCØ1Ø | IOC RECONFIGURATION BIT 0 |
| NIRC11Ø | " " " 1 |
| NIRC21Ø | " " " 2 |
| NIRC31Ø | " " " 3 |
| NIRC41Ø | " " " 4 |
| NUNM21Ø | CP NON-EXISTENT MEMORY CHECK BIT 2 |
| NUNM11Ø | " " " " " " 1 |
| NUNMØ1Ø | " " " " " " Ø |
| NURCØ1Ø | CP RECONFIGURATION BIT Ø |
| NURC11Ø | " " " 1 |
| NURC21Ø | " " " 2 |
| NURC31Ø | " " " 3 |
| NURC41Ø | " " " 4 |
| NBNM21Ø | BUFFER NON-EXISTENT MEMORY CHECK BIT 2 |
| NBNM11Ø | " " " " " " 1 |
| NBNMØ1Ø | " " " " " " Ø |
| NBRC21Ø | BUFFER RECONFIGURATION BIT 2 |
| BNA143Ø | CP/BUFFER ADDRESS BIT 14 |
| NBAC11Ø | BUFFER RECONFIGURATION BIT 1 |
| NBRCØ1Ø | " " " Ø |
| NBRC31Ø | " " " 3 |
| NBRC41Ø | " " " 4 |
| NINM31Ø | IOC NON-EXISTENT MEMORY CHECK BIT 3 |
| NINM41Ø | " " " " " " 4 |
| NINM51Ø | " " " " " " 5 |

| | |
|---|---|
| NINM81Ø | " " " " " " 8 |
| NINM71Ø | " " " " " " 7 |
| NINM61Ø | " " " " " " 6 |

| SIGNAL LOGIC NAME | DEFINITIONS |
|---|---|
| NUNM41Ø | CP NON-EXISTENT MEMORY CHECK BIT 4 |
| NUNM51Ø | " " " " " " 5 |
| NUNM31Ø | " " " " " " 3 |
| NUNM81Ø | " " " " " " 8 |
| NUNM71Ø | " " " " " " 7 |
| NUNM61Ø | " " " " " " 6 |
| NBNM41Ø | BUFFER NON-EXISTENT MEMORY CHECK BIT 4 |
| NBNM51Ø | " " " " " " 5 |
| NBNM81Ø | " " " " " " 8 |
| NBNM71Ø | " " " " " " 7 |
| NBNM61Ø | " " " " " " 6 |
| NUMRE1S | MMS TO CP READ DATA ERROR |
| NURER1S | MMS TO CP RETRYABLE ERROR |
| NUNER1S | MMS TO CP NON-RETRYABLE ERROR |
| NUWRC1S | MMS TO CP WRITE CANCELLED |
| UNMMN1S | CP MODE REQUEST (-1) |
| UNMMØ1S | CP MODE REQUEST Ø |
| UNMM11S | CP MODE REQUEST 1 |
| UNMM21S | CP MODE REQUEST 2 |
| NUNEM1S | MMS TO CP NON-EXISTENT MEMORY |
| UNR241S | CP TO MMS RECONFIGURED MODE |
| UNRC11S | CP TO MMS RECONFIGURED MODE |
| NMACK1S | MMS TO I/O MEMORY ACKNOWLEDGE |
| NMRDS1S | MMS TO I/O READ STROBE |
| NMRER1S | MMS TO I/O RETRYABLE STROBE |
| NMNER1S | MMS TO I/O NON-RETRYABLE ERROR |
| NMERS1S | MMS TO I/O ERROR STROBE |
| NMWRC1S | MMS TO I/O WRITE CANCELLED |

| SIGNAL LOGIC NAME | DEFINITIONS |
|---|---|
| MNACK1T | MMS TO MSS ACKNOWLEDGE INTERFACE SIGNAL |

| | |
|---|---|
| MNRDS1T | MMS TO MSS READ STROBE INTERFACE SIGNAL |
| MNRER1T | MMS TO MSS RETRYABLE ERROR INTERFACE SIGNAL |
| MNNER1T | MMS TO MSS NON-RETRYABLE ERROR INTERFACE SIGNAL |
| MNERS1T | MMS TO MSS ERROR STROBE INTERFACE SIGNAL |
| MNWRC1T | MMS TO MSS WRITE CANCELLED INTERFACE SIGNAL |
| MNSEC1T | MMS TO MSS SINGLE ERROR CORRECT INTERFACE SIGNAL |
| NMMMØ1T | MSS TO MMS DIAGNOSTIC MODE BIT 0 INTERFACE SIGNAL |
| NMMM11T | MSS TO MSS DIAGNOSTIC MODE BIT 1 INTERFACE SIGNAL |
| NMMM21T | MSS TO MMS DIAGNOSTIC MODE BIT 2 INTERFACE SIGNAL |
| MNBZØ1T | MMS TO MSS MODULE 0 BUSY INTERFACE SIGNAL |
| MNBZ11T | " " " " 1 " " " |
| MNBZ21T | " " " " 2 " " " |
| MNBZ31T | " " " " 3 " " " |
| BNAØ83Ø | CPU/BUFFER TO MSS ADDRESS BIT 8 |
| BNAØ93Ø | " " " " " " 9 |
| BNA1Ø3Ø | " " " " " " 10 |
| BNA113Ø | " " " " " " 11 |
| BNA123Ø | " " " " " " 12 |
| BNA133Ø | " " " " " " 13 |
| BNA143Ø | " " " " " " 14 |
| BNA153Ø | " " " " " " 15 |
| BNA163Ø | " " " " " " 16 |
| BNA173Ø | " " " " " " 17 |
| BNA183Ø | " " " " " " 18 |
| BNA193Ø | " " " " " " 19 |
| BNA2Ø3Ø | " " " " " " 20 |
| BNA213Ø | " " " " " " 21 |
| BNA223Ø | " " " " " " 22 |
| BNA233Ø | " " " " " " 23 |

| SIGNAL LOGIC NAME | DEFINITIONS |
|---|---|
| MBAØ83Ø | IOC TO MSS ADDRESS BIT 8 |
| MBAØ93Ø | " " " " " 9 |
| MBA1Ø3Ø | " " " " " 10 |
| MBA113Ø | " " " " " 11 |

| | |
|---|---|
| MBA123Ø | " " " " " 12 |
| MBA133Ø | " " " " " 13 |
| MBA143Ø | " " " " " 14 |
| MBA153Ø | " " " " " 15 |
| MBA163Ø | " " " " " 16 |
| MBA173Ø | " " " " " 17 |
| MBA183Ø | " " " " " 18 |
| MBA193Ø | " " " " " 19 |
| MBA2Ø3Ø | " " " " " 20 |
| MBA213Ø | " " " " " 21 |
| MBA223Ø | " " " " " 22 |
| MBA233Ø | " " " " " 23 |
| MBA243Ø | " " " " " 24 |
| MBA253Ø | " " " " " 25 |
| MBA263Ø | " " " " " 26 |
| MBA273Ø | " " " " " 27 |
| MBA283Ø | " " " " " 28 |
| NBAPB1Ø | BUFFER ADDRESS PARITY CHECK |
| NIAPB1Ø | IOC " " " |
| NUAPB1Ø | CPU " " " |
| MBAP11S | IOC ADDRESS BYTE 1 PARITY BIT |
| MBAP23Ø | " " " 2 " " |
| NIA1B1Ø | IOC ADDRESS BYTE 1 PARITY CHECK |
| NIA2B1Ø | " " " 2 " " |
| NIA3B1Ø | " " " 3 " " |
| NIAPC1Ø | INHIBIT ADDRESS PARITY CHECK |

| SIGNAL LOGIC NAME | DEFINITIONS |
|---|---|
| NAP1Ø1Ø | MMS ADDRESS BYTE 1 PARITY CHECK |
| NAP2Ø1Ø | " " " 2 " " |
| BNAP13Ø | BUFFER ADDRESS BYTE 1 PARITY BIT |
| BNAP23Ø | " " " 2 " " |
| NBA1B1Ø | BUFFER ADDRESS BYTE 1 PARITY CHECK |
| NBA2B1Ø | " " " 2 " " |
| NBA3B1Ø | " " " 3 " " |

| | |
|---|---|
| UNMKØ3Ø | CP WRITE MASK BIT 0 |
| UNMK13Ø | " " " " 1 |
| UNMK23Ø | " " " " 2 |
| UNMK33Ø | " " " " 3 |
| UNMK43Ø | " " " " 4 |
| UNMK53Ø | " " " " 5 |
| UNMK63Ø | " " " " 6 |
| UNMK73Ø | " " " " 7 |
| NNP481Ø | MAIN MEMORY DATA PARITY CHECK BIT 48 |
| NNP491Ø | " " " " " " 49 |
| NNP5Ø1Ø | " " " " " " 50 |
| NNP511Ø | " " " " " " 51 |
| NNP521Ø | " " " " " " 52 |
| NNP531Ø | " " " " " " 53 |
| NNP541Ø | " " " " " " 54 |
| NNP551Ø | " " " " " " 55 |
| NNP561Ø | " " " " " " 56 |
| NNP571Ø | " " " " " " 57 |
| NNP581Ø | " " " " " " 58 |
| NNP591Ø | " " " " " " 59 |
| NNP6Ø1Ø | " " " " " " 60 |

| SIGNAL LOGIC NAME | DEFINITIONS |
|---|---|
| NNP611Ø | MAIN MEMORY DATA PARITY CHECK BIT 61 |
| NNP621Ø | " " " " " " 62 |
| NNP631Ø | " " " " " " 63 |
| NNPP71Ø | MAIN MEMORY DATA PARITY CHECK BYTE 7 |
| NNPP61Ø | " " " " " " 6 |
| MNWRB1Ø | IOC WRITE ABORT |
| NMIOR2Ø | IOC RESERVATION NOT |
| MBRWS1Ø | IOC READ/WRITE SIGNAL |
| UNRWS1Ø | CP " " " |
| UNINT3Ø | CP INITIALIZE |
| UNWAR3Ø | CP WRITE ABORT |
| NCWAB1Ø | WRITE ABORT |

| | |
|---|---|
| NIWAB1Ø | IOC WRITE ABORT |
| NIAPC1Ø | IOC ADDRESS PARITY CHECK INHIBIT |
| MNIME1Ø | IOC NON-RETRYABLE ERROR LATCH |
| UNMXP3Ø | CP WRITE MASK PARITY BIT |
| MNCME1Ø | CP NON-RETRYABLE ERROR LATCH |
| NIDPC1Ø | INHIBIT DATA PARITY CHECK |
| NMBP61Ø | READ DATA BYTE 6 PARITY CHECK |
| NMBP71Ø | " " " 7 " " |
| NIOCD1Ø | IOC GO DELAYED |
| NMAKS1Ø | MEMORY ACKNOLWEDGE SIGNAL |
| NINBY1Ø | IOC CYCLE IN MSS |
| NCPØØ15 | IOC CONTROL FUNCTION |
| NCNBY1Ø | CP CYCLE IN MSS |
| NBUFØ15 | BUFFER CONTROL FUNCTION |
| NBNBY1Ø | BUFFER CYCLE IN MSS |
| NETMS1Ø | CONTROL FROM TIMING |
| NCETR1Ø | CP CONTROL FOR ERROR |
| NIETR1Ø | IOC CONTROL FOR ERROR |
| NBETR1Ø | BUFFER CONTROL FOR ERROR |
| NCNET1Ø | CPU NON-RETRYABLE ERROR CONTROL |

| SIGNAL LOGIC NAME | DEFINTIONS |
|---|---|
| NBNET1Ø | BUFFER N.R. ERROR |
| NIAKS2Ø | IOC ACKNOWLEDGE NOT |
| NCAKS2Ø | CP " " |
| NBAKS2Ø | BUF. " " |
| NIRDS1Ø | IOC READ STROBE |
| NIRDR1Ø | " " CONTROL |
| NCRDS1Ø | CPU READ STROBE |
| NCRDR1Ø | " " CONTROL |
| NBRDS1Ø | BUFFER READ STROBE |
| NBRDR1Ø | " " CONTROL |
| NIRDL1Ø | READ DATA PARITY CONTROL ERROR |
| NCRDL1Ø | " " " " " |
| NIPCS1Ø | IOC READ DATA COMPARE |

| | |
|---|---|
| NIPCR1Ø | " " " " CNTL. |
| NCPCS1Ø | CP " " " |
| NCPCR1Ø | CP " " " CNTL. |
| NBPCS1Ø | BUF. " " " |
| NBPCR1Ø | " " " " CNTL. |
| NIPCL1Ø | IOC RETRYABLE ERROR STROBE |
| NCPCL1Ø | CPU " " " |
| NBPCL1Ø | BUF. " " " |
| MMWØØ3Ø | IOC WRITE DATA BIT 0 |
| MMWØ13Ø | " " " " 1 |
| MMWØ23Ø | " " " " 2 |
| MMWØ33Ø | " " " " 3 |
| MMWØ43Ø | " " " " 4 |
| MMWØ53Ø | " " " " 5 |
| MMWØ63Ø | " " " " 6 |
| MMWØ73Ø | " " " " 7 |
| MMWØ83Ø | " " " " 8 |
| MMWØ93Ø | " " " " 9 |
| MMW1Ø3Ø | " " " " 10 |

| SIGNAL LOGIC NAME | DEFINTIONS |
|---|---|
| MMW113Ø | IOC WRITE DATA BIT 11 |
| BNWØØ1Ø | CP WRITE DATA BIT 0 |
| BNWØ11Ø | " " " " 1 |
| BNWØ21Ø | " " " " 2 |
| BNWØ31Ø | " " " " 3 |
| BNWØ41Ø | " " " " 4 |
| BNWØ51Ø | " " " " 5 |
| BNWØ61Ø | " " " " 6 |
| BNWØ71Ø | " " " " 7 |
| BNWØ81Ø | " " " " 8 |
| BNWØ91Ø | " " " " 9 |
| BNW1Ø1Ø | " " " " 10 |
| BNW111Ø | " " " " 11 |
| NNRØØ1Ø | MAIN MEMORY READ DATA BIT 0 |

| | |
|---|---|
| NNRØ11Ø | " " " " " 1 |
| NNRØ21Ø | " " " " " 2 |
| NNRØ31Ø | " " " " " 3 |
| NNRØ41Ø | " " " " " 4 |
| NNRØ51Ø | " " " " " 5 |
| NNRØ61Ø | " " " " " 6 |
| NNRØ71Ø | " " " " " 7 |
| NNRØ81Ø | " " " " " 8 |
| NNRØ91Ø | " " " " " 9 |
| NNR1Ø1Ø | " " " " " 10 |
| NNR111Ø | " " " " " 11 |
| MMPØØ1Ø | IOC WRITE DATA PARITY CHECK BIT 0 |
| MMPØ11Ø | " " " " " " 1 |
| MMPØ21Ø | " " " " " " 2 |
| MMPØ31Ø | " " " " " " 3 |

| SIGNAL LOGIC NAME | DEFINITIONS |
|---|---|
| MMPØ41Ø | IOC WRITE DATA PARITY CHECK BIT 4 |
| MMPØ51Ø | " " " " " " 5 |
| MMPØ61Ø | " " " " " " 6 |
| MMPØ71Ø | " " " " " " 7 |
| MMPPØ1Ø | IOC WRITE DATA PARITY CHECK BYTE 0 |
| NNPØØ1Ø | MAIN MEMORY PARITY CHECK BIT 0 |
| NNPØ11Ø | " " " " " 1 |
| NNPØ21Ø | " " " " " 2 |
| NNPØ31Ø | " " " " " 3 |
| NNPØ41Ø | " " " " " 4 |
| NNPØ51Ø | " " " " " 5 |
| NNPØ61Ø | " " " " " 6 |
| NNPØ71Ø | " " " " " 7 |
| NNPPØ1Ø | MAIN MEMORY PARITY CHECK BYTE 0 |
| NMLVC1Ø | IOC WRITE DATA CONTROL |
| NBLVC1Ø | CP WRITE DATA CONTROL |
| NICYCØØ | IOC MEMORY CYCLE |
| NBCYCØØ | BUFFER MEMORY CYCLE |

| | |
|---|---|
| MMBPW1Ø | IOC BYTE PARITY |
| NIBPØ1Ø | IOC BAD BYTE PARITY |
| NBBPØ1Ø | BUFFER BAD BYTE PARITY |
| NMBPØ1Ø | MEMORY BAD BYTE PARITY |
| NIDPC1Ø | INHIBIT DATA PARITY CHECK |
| NBNØØ1Ø | BUFFER READ DATA BIT 0 |
| NBNØ11Ø | " " " " 1 |
| NBNØ21Ø | " " " " 2 |
| NBNØ31Ø | " " " " 3 |
| NBNØ41Ø | " " " " 4 |
| NBNØ51Ø | " " " " 5 |
| NBNØ61Ø | " " " " 6 |
| NBNØ71Ø | " " " " 7 |
| NBNØ81Ø | " " " " 8 |

| SIGNAL LOGIC NAME | DEFINITIONS |
|---|---|
| NBNØ91Ø | BUFFER READ DATA BIT 9 |
| NBN1Ø1Ø | " " " " 10 |
| NBN111Ø | " " " " 11 |
| NBUFA20 | BUFFER THE ONLY USER PERMITTED NOT |
| NIOCD10 | IOC GO SIGNAL DELAYED |
| NCPOD10 | CP GO SIGNAL DELAYED |
| NIOCT21 | IOC GO SIGNAL |
| NBMG000 | BUFFER GO SIGNAL |
| NIOCA1Ø | IOC ONLY |
| NMIOR1Ø | RESERVE MSS FOR THE IOC |
| NMSSZ1Ø | MSS BUSY |
| NBUFO1Ø | MSS ASSIGNED TO BUFFER |
| NBSIN10 | BUFFER SAMPLE INHIBIT SIGNAL |
| NRECY34 | MAIN MEMORY IN RECONFIGURED MODE |
| NRECN34 | MAIN MEMORY IN NORMAL CONFIGURATION MODE |
| NIWBK20 | IOC TO PERFORM WRITE NOT |
| UNMG010 | GO SIGNAL ISSUED BY THE CPU |

What is claimed is:

1. An asynchronous main store sequencer (MSS) for processing information between a main memory store (MMS) and a central processing unit (CPU), buffer store (BS) and input output control unit (IOC), and for asynchronously resolving priority conflicts for MMS access among the CPU, BS and IOC units, said CPU, BS, or IOC being responsive to a common strobe signal, said MSS comprising:

a. first signal means, coupled to said CPU, BS and IOC units, and responsive to said common strobe signal for simultaneously issuing Go signals which indicate a request for control of said MSS by the unit issuing the Go signal;

b. variable delay line means coupled to said CPU, BS and IOC units for delaying by various predetermined amounts the Go signal issued by any or all of said CPU, BS or IOC units;

c. priority resolving means in said MSS coupled to said variable delay line means, said priority resolving means responsive to the first Go signal received by said priority resolving means from one of said CPU, BS or IOC for assigning control of said MMS to the CPU, BS or IOC on a first-come-first-served basis;

d. lockout means, coupled to said priority resolving means, for preventing higher priority units from obtaining control of said MSS until the controlling unit of said MMS terminates its processing.

2. An asynchronous main store sequencer (MSS) as recited in claim 1 wherein said MMS is comprised of a plurality of said MMS modules including module select means coupled to said priority resolving means for selecting one of said memory modules to communicate with one of said CPU, BS or IOC units having control of said MSS.

3. An asynchronous main store sequencer (MSS) as recited in claim 2 including first transmitter means coupled to said priority resolving means for transmitting the Go signal from said MSS to said MMS.

4. An asynchronous main store sequencer (MSS) as recited in claim 3 including first receiver means coupled to said first transmitter means for receiving the Go signal of said CPU, BS or IOC unit then having control of said MSS from said first transmitter means.

5. An asynchronous main store sequencer (MSS) as recited in claim 4 including lockout means coupled to said first receiver means, said lockout means responsive to the Go signal of the CPU, BS or IOC unit then having control of the MSS to prevent acceptance of a Go signal by said MSS of a CPU, BS or IOC which does not then have control of said MSS.

6. An asynchronous main store sequencer (MSS) as recited in claim 5 including acknowledge means coupled to said first receiver means and to said lockout means, for issuing an acknowledge signal to the MSS indicating receipt of the Go signal issued by the CPU, BS or IOC unit thus having control of the MSS.

7. An asynchronous main store sequencer (MSS) as recited in claim 6 including second receiver means coupled to said acknowledge means for receiving the acknowledge signal issued by said acknowledge means.

8. An asynchronous main store sequencer (MSS) as recited in claim 7 including current-memory-busy network coupled to said second receiver means and to said priority resolving means, said current-memory-busy network for issuing signals to said priority resolving network indicative of the current state of said MSS whereby said priority resolving means utilizes the information relative to the current state of said MMS to resolve priority conflicts among said CPU, BS and IOC units for control of said MSS.

9. An asynchronous main store sequencer (MSS) as recited in claim 8 including information line means coupled to said MMS and to said CPU, BS and IOC units for reading or writing information out of or into said MMS from selected ones of said CPU, BS or IOC units.

10. An asynchronous main store sequencer (MSS) as recited in claim 9 including reservation line means coupled to said MSS and to said MMS for reserving the MMS for a selected one of said CPU, BS or IOC units for more than one MSS cycle.

11. An asynchronous main store sequencer (MSS) as recited in claim 10 including strobe means coupled to said MMS and to said MSS for issuing a strobe signal to said MSS indicating information is on said information lines and available from said MMS.

12. An asynchronous main store sequencer (MSS) as recited in claim 11 including storing means in said MSS coupled to said MMS and to said CPU, BS and IOC units, said storing means responsive to said strobe means and to a selected one of said CPU, BS or IOC unit for reading or writing information into or out of said MMS.

13. In combination with an asynchronous main store sequencer (MSS) a priority resolving network for resolving priority conflicts on a first-come-first-served basis among units competing for control of the MSS, said combination including a main memory store (MMS), a central processing unit (CPU), buffer store (BS), and input output control unit (IOC), said CPU, BS, or IOC being responsive to a common strobe signal, said MSS comprising:

a. first signal means, coupled to said competing units, and responsive to said common strobe signal for simultaneously issuing Go signals which indicate a request for control of said MSS by the competing unit issuing the Go signal;

b. variable delay line means coupled to said MSS and to said units competing for MSS control, said variable delay line means for delaying the Go signal issued by each of said units competing for MSS control;

c. information line means coupled to said MSS and to said units competing for MSS control, said information line means for carrying data and control signals between said competing units and said MSS;

d. competing-unit select means coupled to said delay line means, said MSS, and to each of said units competing for MSS control, said select means responsive to selected signals on said information line means and to signals indicative of the state of the competing units, the state of the MSS and the first received Go signal by the MSS for selecting one of said competing units to acquire control of the MSS;

e. lockout means, coupled to said priority resolving means, for preventing higher priority units from obtaining control of said MSS until the controlling unit of said MMS terminates its processing.

14. The combination as recited in claim 13 wherein said combination includes a main memory store (MMS) having a plurality of memory modes and further including MMS select means coupled to said variable delay line means, said MMS select means responsive to signals from selected ones of said information line means, and to the Go signal of the competing unit then in control of the MSS, said MMS select means for selecting the MMS module to be accessed by the competing unit then in control of the MSS.

15. The combination as recited in claim 14 including assignment flag means coupled to said MMS and the said MSS and responsive to signals on selected ones of said information line means, said assignment flag means for generating signals indicative of the state of said MMS.

16. The combination as recited in claim 15 including blocking means coupled to said MMS and said MSS, and responsive to signals on selected ones of said information line means and to signals indicative of the state of said MMS, said blocking means for preventing access to said MSS by competing units not then in control of said MSS.

* * * * *